United States Patent
Lean et al.

(10) Patent No.: US 8,059,667 B2
(45) Date of Patent: Nov. 15, 2011

(54) METHODS, SYSTEMS, AND COMPUTER PROGRAM PRODUCTS FOR APPLYING MULTIPLE COMMUNICATIONS SERVICES TO A CALL

(75) Inventors: Yoogin Lean, Apex, NC (US); Gaurang Kalyanpur, Allen, TX (US); Amrit P. S. Wadhwa, Cary, NC (US)

(73) Assignee: Tekelec, Morrisville, NC (US)

( * ) Notice: Subject to any disclaimer, the term of this patent is extended or adjusted under 35 U.S.C. 154(b) by 493 days.

(21) Appl. No.: 12/023,601

(22) Filed: Jan. 31, 2008

(65) Prior Publication Data

US 2008/0181382 A1  Jul. 31, 2008

Related U.S. Application Data

(60) Provisional application No. 60/898,754, filed on Jan. 31, 2007.

(51) Int. Cl.
 *H04L 12/28* (2006.01)
(52) U.S. Cl. ............ 370/401; 370/352; 379/201.02
(58) Field of Classification Search .............. 370/252, 370/352, 401; 379/15.03, 120, 201.01–201.05, 379/201.12
 See application file for complete search history.

(56) References Cited

U.S. PATENT DOCUMENTS

| | | | |
|---|---|---|---|
| 4,191,860 A | 3/1980 | Weber | |
| 5,602,909 A | 2/1997 | Carkner et al. | |
| 5,650,998 A | 7/1997 | Angenot et al. | |
| 5,671,225 A | 9/1997 | Hooper et al. | |
| 5,838,683 A | 11/1998 | Corley et al. | |
| 5,852,660 A | 12/1998 | Lindquist et al. | |
| 6,002,693 A | 12/1999 | Hahn | |
| 6,134,618 A | 10/2000 | Hebert | |
| 6,145,120 A | 11/2000 | Highland | |
| 6,167,129 A | 12/2000 | Fikis et al. | |
| 6,182,086 B1 | 1/2001 | Lomet et al. | |
| 6,249,572 B1 | 6/2001 | Brockman et al. | |
| 6,311,323 B1 | 10/2001 | Shulman et al. | |

(Continued)

FOREIGN PATENT DOCUMENTS

EP  1 217 816 A1  6/2002

(Continued)

OTHER PUBLICATIONS

Notification of Transmittal of the International Search Report and the Written Opinion of the International Searching Authority, or the Declaration for International Application No. PCT/US08/01285 (Jun. 2, 2008).

(Continued)

*Primary Examiner* — Ricky Ngo
*Assistant Examiner* — Kan Yuen
(74) *Attorney, Agent, or Firm* — Jenkins, Wilson, Taylor & Hunt, P.A.

(57) ABSTRACT

Methods, systems, and computer program products for providing an enriched messaging service in a communications system is described. In one embodiment, the method includes receiving a signaling message associated with a call at one of a plurality of service dispatch and control (SDC) functions, wherein the call signaling message includes a subscriber identifier. A plurality of call services associated with the subscriber identifier that is to be applied to the call is determined. The method also includes communicating the signaling message from the SDC function to a service platform and receiving back at the SDC function for each of the plurality of call services and thereby sequentially applying the call services to the call.

19 Claims, 16 Drawing Sheets

U.S. PATENT DOCUMENTS

| | | |
|---|---|---|
| 6,327,267 B1 | 12/2001 | Valentine et al. |
| 6,396,840 B1 | 5/2002 | Rose et al. |
| 6,434,135 B1 | 8/2002 | Jones et al. |
| 6,578,187 B2 | 6/2003 | Yasuda |
| 6,611,584 B1 | 8/2003 | Khello et al. |
| 6,625,273 B1 | 9/2003 | Ashdown et al. |
| 6,731,741 B1 | 5/2004 | Fourcand et al. |
| 6,748,585 B2 | 6/2004 | Proebsting et al. |
| 6,779,030 B1 | 8/2004 | Dugan et al. |
| 6,785,374 B2 | 8/2004 | Wang et al. |
| 6,795,546 B2 | 9/2004 | Delaney et al. |
| 6,944,666 B2 | 9/2005 | Belkin |
| 6,959,076 B2 | 10/2005 | Chang et al. |
| 7,286,545 B1 | 10/2007 | Tester et al. |
| 7,554,974 B2 | 6/2009 | Palmer et al. |
| 7,856,094 B2 | 12/2010 | Khadri et al. |
| 2001/0046285 A1 | 11/2001 | Park |
| 2001/0053218 A1 | 12/2001 | Leung et al. |
| 2002/0048360 A1 | 4/2002 | Zambre et al. |
| 2002/0054674 A1* | 5/2002 | Chang et al. ............. 379/207.02 |
| 2002/0059411 A1 | 5/2002 | Barnhouse et al. |
| 2002/0163922 A1 | 11/2002 | Dooley et al. |
| 2002/0178262 A1 | 11/2002 | Bonnell et al. |
| 2002/0191768 A1* | 12/2002 | Stoughton ..................... 379/219 |
| 2003/0037108 A1 | 2/2003 | Peiffer et al. |
| 2003/0050969 A1 | 3/2003 | Sant et al. |
| 2003/0231652 A1 | 12/2003 | Sprague et al. |
| 2003/0235285 A1 | 12/2003 | Marsico |
| 2004/0024894 A1 | 2/2004 | Osman et al. |
| 2004/0264671 A1 | 12/2004 | Lamberton et al. |
| 2005/0094623 A1 | 5/2005 | D'Eletto |
| 2005/0141528 A1 | 6/2005 | Matsuhashi et al. |
| 2005/0203994 A1 | 9/2005 | Palmer et al. |
| 2006/0143517 A1 | 6/2006 | Douceur et al. |
| 2006/0209791 A1* | 9/2006 | Khadri et al. ................. 370/352 |
| 2007/0086582 A1 | 4/2007 | Tai et al. |
| 2007/0168421 A1 | 7/2007 | Kalyanpur et al. |
| 2007/0206735 A1* | 9/2007 | Silver et al. ................. 379/88.19 |
| 2008/0209564 A1 | 8/2008 | Gayde et al. |
| 2008/0260119 A1 | 10/2008 | Marathe et al. |
| 2008/0285438 A1 | 11/2008 | Marathe et al. |
| 2010/0118866 A1* | 5/2010 | Cannon ......................... 370/352 |
| 2011/0040884 A1 | 2/2011 | Khadri et al. |

FOREIGN PATENT DOCUMENTS

| | | |
|---|---|---|
| KR | 2003-0025024 A | 3/2003 |
| WO | WO 02/07456 A1 | 1/2002 |
| WO | WO 2007/081934 A2 | 7/2007 |
| WO | WO 2008/130709 A2 | 10/2008 |

OTHER PUBLICATIONS

Non-Final Official Action for U.S. Appl. No. 11/392,241 (May 25, 2010).

Restriction and/or Election Requirement for U.S. Appl. No. 12/106,807 (Apr. 28, 2010).

Non-Final Official Action for U.S. Appl. No. 12/106,869 (Apr. 15, 2010).

Non-Final Official Action for U.S. Appl. No. 11/085,620 (Apr. 15, 2010).

Communication pursuant to Article 94(3) EPC for European Application No. 05 725 074.8 (Mar. 26, 2010).

Official Action for Chinese Patent Application No. 200680017480.6 (Mar. 18, 2010).

Summons to Attend Oral Proceedings Pursuant to Rule 115(1) EPC for European Patent No. 1568203 (Mar. 11, 2010).

Communication of European Publication Number and Information on the Application of Article 67(3) EPC for European Patent No. 2143230 (Dec. 16, 2009).

Supplementary European Search Report for European Patent No. 1738269 (Dec. 11, 2009).

"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).

"INAP Feature Module," Cisco MGC Software Release 9.5(2), pp. 1-16 (Dec. 3, 2003).

"Tekelec Introduces TekWare™ IN and TekWare Mediation," Tekelec, p. 1 (May 28, 2003).

"Tekelec Announces Advanced Signaling Architecture—TekWare," Tekelec, pp. 1-3 (Jun. 4, 2002).

Marshall et al., "SIP Extensions for Supporting Distributed Call State," SIP Working Group, Internet Draft, pp. 1-12 (Aug. 2001).

Crowe, "Cellular Network Perspectives," Wireless Review, pp. 1-4 (Mar. 2001).

"Interface Recommendation for Intelligent Network Capability Set 3: SCF-SSF Interface," ITU-T, Q.1238.2, pp. 7-9, 73-76, and 85-10 (Jun. 2000).

"Signalling System No. 7—ISDN User Part Functional Description," ITU-T, Q.762 (Dec. 1999).

"Signalling System No. 7—ISDN User Part Functional Description," ITU-T, Q.761 (Dec. 1999).

Handley et al., "SIP: Session Initiation Protocol," Network Working Group, RFC 2543 (Mar. 1999).

"Eagle STP Platform," Tekelec, Publication 908-0126-01, Rev. A, pp. 1-4 (Copyright 1997).

Final Official Action for U.S. Appl. No. 11/085,620 (Jun. 19, 2009).

Interview Summary for U.S. Appl. No. 11/085,620 (Apr. 30, 2009).

Notice of Allowance and Fee(s) Due for U.S. Appl. No. 10/796,653 (Feb. 26, 2009).

Office Action for U.S. Appl. No. 11/085,620 (Dec. 19, 2008).

Notice of Panel Decision from Pre-Appeal Brief Review for U.S. Appl. No. 10/796,653 (Dec. 8, 2008).

Communication of European Publication Number and Information on the Application of Article 67(3) EPC for European Application No. 07 709 644.4 (Sep. 3, 2008).

Communication pursuant to Article 94(3) EPC for European Application No. 03 796 406.1 (Jun. 19, 2008).

Office Action for U.S. Appl. No. 10/796,653 (Apr. 30, 2008).

Notification of European Publication Number and Information on the Application of Article 67(3) EPC for European Application No. 06 739 166.4 (Nov. 21, 2007).

Notification of Transmittal of the International Search Report and the Written Opinion of the International Searching Authority, or the Declaration for International Application No. PCT/US07/00492 (Oct. 19, 2007).

Notification of Transmittal of the International Search Report and the Written Opinion of the International Searching Authority, or the Declaration for International Application No. PCT/US06/10263 (Sep. 25, 2007).

Office Action for U.S. Appl. No. 10/796,653 (Oct. 2, 2007).

Communication pursuant to Article 96(2) EPC for European Application No. 03 796 406.1 (Sep. 28, 2006).

Notification of Transmittal of the International Search Report and Written Opinion of the International Searching Authority, or the Declaration for International Application No. PCT/US05/07712 (Jul. 25, 2006).

Supplementary European Search Report for European Application No. 03 796 406.1 (May 10, 2006).

Notification of European Publication Number and Information on the Application of Article 67(3) EPC for European Application No. 03 796 406.1 (Jul. 20, 2005).

Notification of Transmittal of the International Search Report or the Declaration for International Application No. PCT/US03/36520 (Jul. 6, 2004).

Notice of Allowance and Fee(s) Due for U.S. Appl. No. 10/294,400 (Apr. 28, 2004).

Redmill, "An Introduction to SS7," Booktrout Technology, pp. 1-26 (Jul. 2001).

"Integrated Services Digital Network (ISDN); Signalling System No. 7 (SS7); ISDN User Part (ISUP) Version 4 for the International Interface; Part 1: Basic Services," European Telecommunications Standards Institute, ETSI EN 300 356-1, V4.2.1, pp. 1-44 (May 2001).

"Integrated Services Digital Network (ISDN); Signalling System No. 7; Signalling Connection Control Part (SCCP) (connectionless and connection-oriented) to Support International Interconnection; Part 1: Protocol Specification," European Telecommunications Standards Institute, ETSI EN 300 009-1, V1.4.2, pp. 1-18 (Nov. 1999).

Liao et al., "SS7-TCAP/IP Interworking," Internet Engineering Task Force, pp. 1-14 (Mar. 1999).

Notification of Transmittal of the International Search Report and the Written Opinion of the International Searching Authority, or the Declaration for International Application No. PCT/US2008/005175 (Aug. 12, 2008).

Commonly-assigned, co-pending U.S. Appl. No. 12/106,869 for "Methods, Systems, and Computer Program Products for Providing Fault-Tolerant Service Interaction and Mediation Function in a Communications Network," (Unpublished, filed Apr. 21, 2008).

Commonly-assigned, co-pending U.S. Appl. No. 12/106,807 for "Systems, Methods, and Computer Program Products for Providing Service Interaction and Mediation in a Communications Network," (Unpublished, filed Apr. 21, 2008).

Final Official Action for U.S. Appl. No. 11/392,241 (Dec. 7, 2010).

Commonly-assigned, co-pending U.S. Appl. No. 12/913,735 for "Methods, Systems, and Computer Program Products for Providing Telecommunications Services Between a Session Initiation Protocol (SIP) Network and a Signaling System 7 (SS7) Network," (Unpublished, filed Oct. 27, 2010).

Final Official Action for U.S. Appl. No. 12/106,869 (Oct. 27, 2010).

Notice of Allowance and Fee(s) Due for U.S. Appl. No. 11/085,620 (Sep. 17, 2010).

Interview Summary for U.S. Appl. No. 11/392,241 (Sep. 9, 2010).

European Search Report for European Patent No. 1867115 (Sep. 3, 2010).

Non-Final Official Action for U.S. Appl. No. 12/106,807 (Aug. 5, 2010).

First Office Action for Chinese Patent Application No. 200780008487.6 (Mar. 12, 2010).

Gurbani et al., "Accessing IN services from SIP networks," Internet-Draft, pp. 1-20 (Feb. 2001).

Haerens, "Intelligent Network Application Part (INAP) Support of the SIP/SDP Architecture," SIP Working Group, Internet Draft, pp. 1-12 (Oct. 1999).

Notice of Abandonment for U.S. Appl. No. 12/106,869 (May 10, 2011).

Notice of Panel Decision from Pre-Appeal Brief Review for U.S. Appl. No. 11/392,241 (May 9, 2011).

Non-Final Official Action for U.S. Appl. No. 12/106,807 (Feb. 15, 2011).

Communication under Rule 71(3) EPC for European Application No. 03 796 406.1 (Dec. 27, 2010).

Second Office Action for Chinese Patent Application No. 200780008487.6 (Aug. 2, 2011).

Notice of Allowance and Fee(s) Due for U.S. Appl. No. 11/392,241 (Jul. 20, 2011).

Notice of Granting Right for Invention for Chinese Patent Application No. 200680017480.6 (Jun. 27, 2011).

* cited by examiner

METHODS, SYSTEMS, AND COMPUTER PROGRAM PRODUCTS FOR APPLYING MULTIPLE COMMUNICATIONS SERVICES TO A CALL

RELATED APPLICATIONS

The present application claims the benefit of U.S. Provisional Patent Application Ser. No. 60/898,754, filed Jan. 31, 2007; the disclosure of which is incorporated herein by reference in its entirety.

TECHNICAL FIELD

The subject matter described herein relates to the provisioning of telecommunications services and signaling networks. More particularly, the subject matter described herein relates to methods, systems, and computer program products for providing multiple communications services to a call.

BACKGROUND

Presently, telecommunications service providers utilize different service application platforms in their networks in order to provide various services to a given call. For example, upon receiving a call signaling message, a servicing creation system (SCS) server node in a provider's network may send a message or forward a call signaling message (or an encapsulated version) to a plurality of service application platforms. More specifically, the message is sent to the service applications in a predefined order. After one service application platform has processed the message (e.g., invoked the service), the message is forwarded to the next service application platform according to the predefined order. Unfortunately, this configuration for distributing the call signaling message to each service application requires that each service platform is equipped with some form of intelligence so that the services applied to the call may be kept track of. In addition, because each service application platform may be required to provision the service platform subsequently accessed with failure scenarios, additional resources may be needed to provide the service platforms with the requisite processing power. Moreover, communications conducted among the service platforms typically require the involvement of non-standard signaling, which can give rise to communications and compatibility problems that may otherwise be avoided.

Accordingly, there exists a need for improved methods, systems, and computer program products for applying multiple communications services to a call.

SUMMARY

According to one aspect, the subject matter described herein comprises methods, systems, and computer program products for applying multiple communications services to a call in a communications system. One method includes receiving a signaling message associated with a call at one of a plurality of service dispatch and control (SDC) functions, wherein the call signaling message may include a subscriber identifier, such as a calling party identifier and a called party identifier. In one example, a plurality of call services associated with the subscriber identifier that is to be applied to the call is determined. The method also includes communicating the signaling message from the SDC function to a service platform and receiving a message back at the SDC function for each of the plurality of call services and thereby sequentially applying the call services to the call.

The subject matter described herein for applying multiple communications services to a call may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for applying multiple communications services to a call described herein. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

The present subject matter relates to systems, methods, and computer program products for applying multiple communications services to a call or similar communications transaction. According to one embodiment of the present subject matter, a service dispatch and control (SDC) function may be used to provision communications services, such as screening services, number translation services, prepaid application services, and other wireline and wireless communications services to a serviced call.

Figure 1:
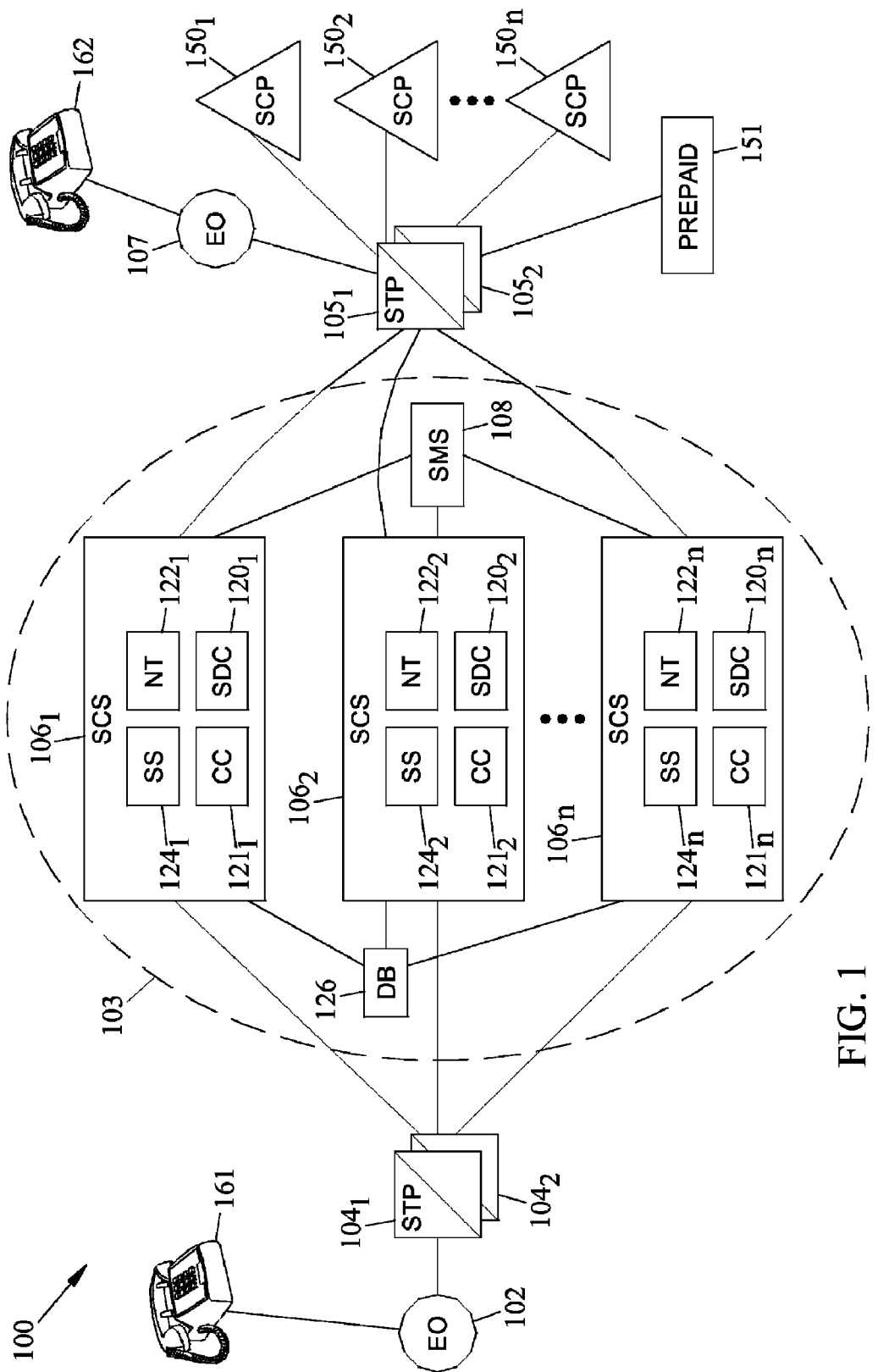
FIG. 1 is an exemplary communications system for providing multiple communication services to a call according to an embodiment of the subject matter described herein.

FIG. 1 illustrates an exemplary communications system 100 for applying multiple communications services to a given call or like communications transaction. For example, system 100 may be used to develop and deploy triggerless services based on ISDN user part (ISUP)/telephone user part (TUP) applications. In one embodiment, communications system 100 includes a first end office (EO) 102, a second EO 107, a first signal transfer point (STP) pair 104, a second STP pair 105, a service creation system (SCS) cluster 103, and a plurality of application servers $150_{1...n}$ (e.g., SS7 service control points (SCPs), IP multimedia subsystem (IMS) application servers, session initiation protocol (SIP) application servers, simple object application protocol (SOAP) servers, communications service application servers, etc.). Although FIG. 1 only depicts STP pair 104 and STP pair 105, additional STP pairs or standalone STPs may be used in system 100. Furthermore, any other type of network routing node, such as a session initiation protocol (SIP) router, IP multimedia subsystem (IMS) node, and the like, may be implemented in system 100 in the place of STP pair 104 or 105 without departing from the scope of the present subject matter.

In one embodiment, end office 102 (e.g., a service signaling point (SSP)) may be configured to generate a call signaling message in response to a calling party 161 attempting to place a call to a called party 162. Calling party 161 may utilize any device, such as a telephone, Internet protocol (IP) telephone, a personal computer, or similar communications device, to initiate a call or communication session (e.g., multimedia session, etc.). STP pair 104 may collectively function as a network node that is adapted to receive the call signaling message from EO 102. STP pair 104 may be connected to SCS cluster 103 via transport adapter layer interface (TALI) links or SIGTRAN links, such as M3UA or SUA links, which may be utilized to forward the call signaling message to at least one of the SCS nodes $106_{1...n}$ in cluster 103. SCS cluster 103 may be adapted to function as a decision maker during the initial call setup phase. For example, SCS nodes $106_{1...n}$ may act as a collection of core service logic software that handles call signaling message analysis and decision making for system 100. In one embodiment, SCS cluster 103 is deployed as a set of servers that operate in a load-shared mode that handles call signaling messages from STP 104 (or STP 105). Furthermore, SCS nodes $106_{1...n}$ in cluster 103 share the same configuration data, call context data, and provisioning data (i.e., each SCS node 106 is a replica in this regard) via one or more synchronization processes that are described in detail below. In one embodiment, a communication core object library (COMCOL) in-memory database (IDB) inetsync mechanism is used for synchronizing various data across cluster 103. Thus, if any SCS node 106 becomes inoperable, a failover process may be automatically handled at STP 104 (or pair 105) by a dynamic load-sharing scheme to utilize another SCS node in cluster 103. In addition to SCS nodes $106_{1...n}$, SCS cluster 103 also includes a service management system (SMS) node 108. SMS node 108 may act as an SCS provisioning/maintenance interface using web-based or MML applications. As shown in FIG. 1, SMS node 108 is coupled to each of the SCS nodes 106 in cluster 103.

Each SCS node 106 in cluster 103 contains a service dispatch and control (SDC) function 120, which may be implemented as a hardware component, software/firmware program (or module), or a combination of both. In one embodiment, SDC 120 is adapted to apply multiple subscribed services to a call session or communications transaction associated with a received call signaling message. For example, SDC 120 may route the call signaling messages and coordinate the application of SCS-based services and external services to the associated call session. SDC 120 manages multiple services and ensures that the routing of a call signaling message to each of these services (if applicable to a given subscriber) is based upon a provisioned and predefined order (e.g., after a successful screening). In one embodiment, the predefined order maintained by SDC 120 is unique to each subscriber and is maintained in a database 126. For example, database 126, which may be accessed by each SCS node 106, may contain a list of calling subscribers, a list of corresponding subscribed services, and the order in which the services are to be invoked with regard to a call. In addition to other functions, SDC 120 is responsible for handling call signaling messages (e.g., ISUP/TUP) or transaction messages from end office 102 (e.g., via STP 104 through TALI or SIGTRAN links). In one embodiment, SDC 120 also maintains and manages call context data 121 and controls the call flow.

In one embodiment, SCS node 106 may support services that are local or internal. For example, call screening service platform 124 and number translation service platform 122 may be deployed as applications on the same SCS node 106 that is hosting SDC 120. In order to optimize processing resources, SDC 120 may utilize a local inter process communications (IPC) mechanism to communicate with call screening service platform 124, number translation (NT) service platform 122, or any other service application platform that is deployed locally on SCS node 106. In one embodiment, COMCOL's shared memory based queues may be used to implement the IPC mechanism. Similarly, SCS node 106 can support external services, like prepaid calling services 151, via STP 105.

In one exemplary embodiment illustrating the functionality of SDC 120, a call signaling message for a call session is received from EO 102 via STP 104. SDC 120 subsequently examines the received call signaling message for a subscriber identifier (e.g., a calling party number or a called party number) in order to determine the subscription of services that may be invoked for the call. For example, SDC 120 may query database 126 using the identifier to determine a predefined order of applicable services in which the call signaling message is to be forwarded. As mentioned above, the predefined order may be unique to a subscriber associated with the calling party identifier. SDC 120 is also responsible for creating and maintaining call context data 121 for context sensitive services, such as prepaid calling service platform 151. In one embodiment, call context data 121 may include the origination point code (OPC), the destination point code (DPC), and the circuit identification code (CIC) that pertains to the call. Call context data 121 may also contain the list (and order) of service applications (e.g., obtained from database 126) to be invoked for a given call.

In one embodiment, call context data 121 is synchronized across all the SCS nodes $106_{1...n}$ of cluster 103. For example, the synchronization of call context data 121 may be conducted by transmission control protocol (TCP)/stream control transmission protocol (SCTP), or a user datagram protocol (UDP) multicast. By synchronizing call context data 121 across cluster 103, each and every SCS node 106 is able to handle any message related to a given call (since each SCS node 106 is provisioned with identical call context data 121). In one embodiment, call context data 121 is synchronized only if the services which need to be invoked during the call session are either external to the SCS node or are context sensitive (see more details below).

As mentioned above, call context data 121 includes a list of predefined services that may be applied to a call. The services contained in call context data 121 (and database 126) may be categorized as either stateless services or context sensitive (i.e., state sensitive) services. Stateless services, such as screening and number translation, are invoked upon the receipt of an initial address message (IAM) from the customer network (via end office 102). These types of services are not concerned with other messages during the call control. Alternatively, the context sensitive services, such as prepaid services, are services dependent on state information and are provided messages at every stage of the call (in order to keep the state updated).

In general, there are two possible IDB synchronization setups that may be conducted across all SCS and SMS servers in cluster 103. In the first setup, SDC 120 functions as the front end application at SCS 106, which is adapted to interact with the customer network. SDC 120 may route the messages and coordinate with the SCS based services, such as screening 124 and number translation 122, and external services like a prepaid call service 151. In one embodiment, SDC 120 exchanges messages with the subscription services by encapsulating a calling signaling message (e.g., message signaling unit (MSU)) in a signaling connection control part (SCCP) unit data message. For example, SDC 120 may send an SCCP message to an external application (e.g., prepaid service 151) via STP 104 over TALI (or SIGTRAN), which is then routed to the external application platform over MTP3 user adaptation layer (M3UA). Similarly, SDC 120 may send the message to a co-located service (e.g., screening service 124 or NT service 122) using IPC.

After sending an encapsulated message to a service (e.g., screening), SDC 120 receives a successful response, such as an IAM message encapsulated in an SCCP message, from that service. For example, the application may use the same SCCP addressing format and user data format for returning the ISUP data to SDC 120. The application may use the SDC point code and a subsystem number (SSN) in CDPA, and its own point code and SSN in CGPA. In addition, in the case of an external application (e.g., prepaid service 151), STP 104 may route the message transparently over TALI or SIGTRAN to SCS 106. Alternatively, a co-located service (e.g., screening service 124) may send a message to SDC 120 using IPC.

After receiving the message from the first service platform, SDC 120 then routes the original encapsulated message to the next service listed in call context data 121. Depending on its destination, a message may be routed in various ways. If the message destination (i.e., service application) is external to SCS node 106, then the message is sent to STP 105 via TALI. or SIGTRAN Afterwards, STP 105 routes the message to the appropriate external service SCP 150. For example, where the subscription service is a prepaid service 151, SDC 120 sends the encapsulated call signaling message to STP 104 on TALI or SIGTRAN. STP 105 then routes the message to prepaid service 151 using MTP3 user adaptation layer (M3UA) protocol. After receiving the SCCP message from the service, SDC 120 sends the SCCP message to the next appropriate service (i.e., in the predefined order specified in the call context data 121). Once SDC 120 receives the SCCP message from the last service indicated in call context data 121, SDC 120 passes the original call signaling message to the actual destination (e.g., called party 162) via STP 105 in order to setup the call.

Figure 2:
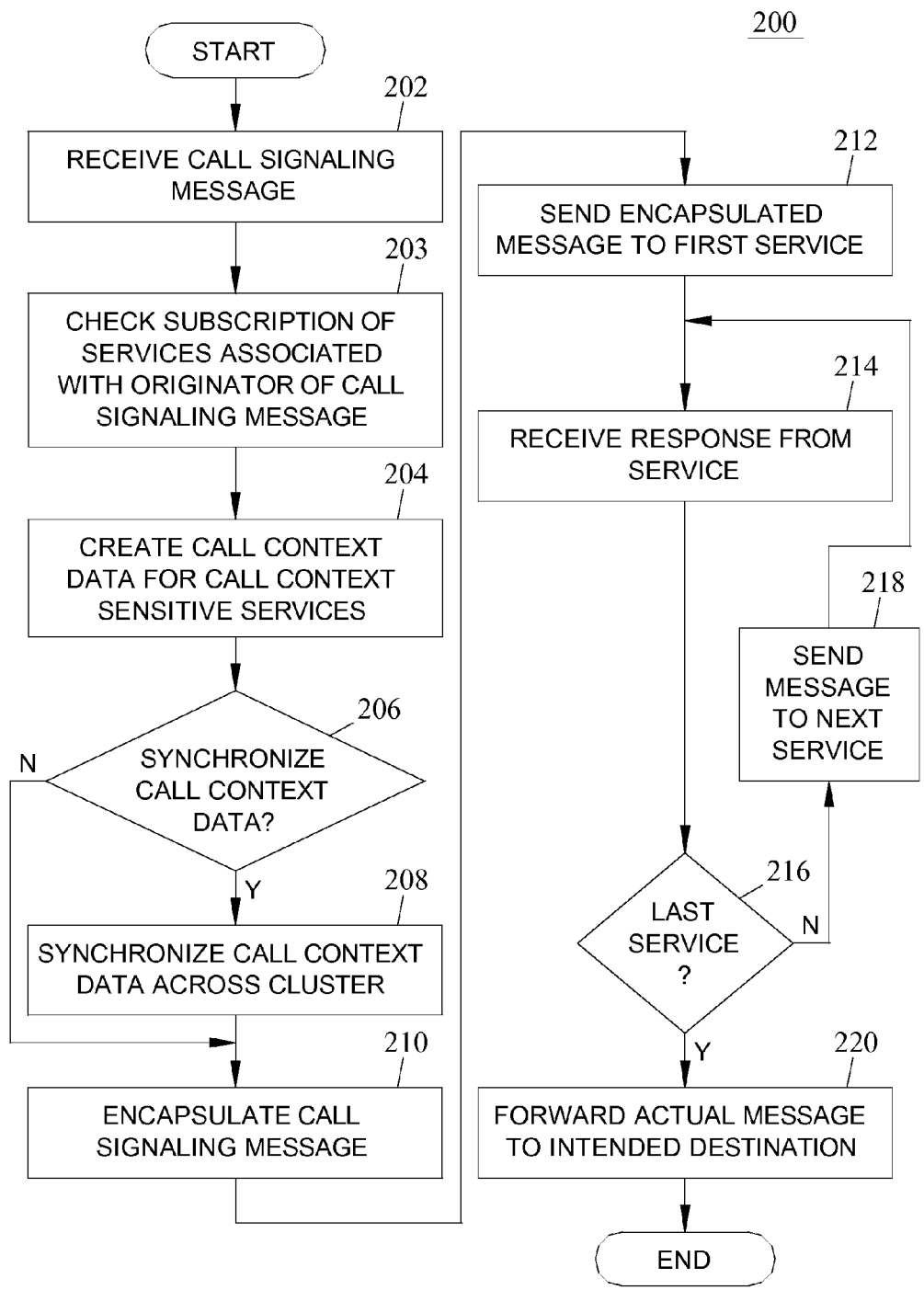
FIG. 2 is a flow chart illustrating exemplary steps for providing multiple communications services to a call according to an embodiment of the subject matter described herein.

One example of providing a plurality of services to a call or communications transaction is depicted as method 200 in FIG. 2. In block 202, a call signaling message is received. In one embodiment, SDC 120 receives a call signaling message from a calling subscriber that originates from a consumer network (e.g., device 161 by way of EO 102) via STP 104. For example, the call signaling message may be received from STP 104 via a TALI or SIGTRAN link. The received call signaling message may be an (ISUP) message or (TUP) message, or the like.

In block 203, the subscription of services associated with the origination of the call signaling message is checked. In one embodiment, a calling party identifier is extracted from the call signaling message by SDC 120. SDC 120 then compares the calling party identifier found in the signaling message with entries in a subscriber database 126. Thus, the services associated with a subscriber (by using the calling party identifier) may be determined.

In block 204, a call context data file is created. In one embodiment, SDC 120 creates call context data 121 for the communications transaction (e.g., a call session) associated with the received call signaling message. For example, call context data 121 for a call may include an originating point code (OPC), a destination point code (DPC), a circuit identification code (CIC), a list of services to be applied to the call, and the like. Call context data 121 is created for call context sensitive services that are found in block 203 (e.g., prepaid calls).

In block 206, a determination is made as to whether the call context data is to be synchronized. The determination to synchronize (e.g., provision call context data 121 among the SCS servers) may arise if the context data is created, updated, deleted, or otherwise modified by SDC 120. In one embodiment, SDC 120 determines if the services which need to be invoked during the call (e.g., services found in block 203) are external to SCS server 106 or are context sensitive. Notably, services that are context sensitive require frequent synchronizations. If the call context data is synchronized, method 200 proceeds to block 208. If the call context is not synchronized, method 200 continues to block 210.

In block 208, the call context data is synchronized. In one embodiment, SDC 120 synchronizes call context data 121 across cluster 103 so that each of the remaining SDC $120_{1 \ldots n}$ is provisioned with the most recent call context data. By being provisioned with the latest call context data, each SDC 120 is capable of processing the call further, if necessary. Namely, all messages related to the call may be handled by any SCS server 106 within cluster 103 by using the synchronized call context data. In one embodiment, a COMCOL IDB inetsync mechanism or software function is used for call context data synchronization across cluster 103.

In block 210, the call signaling message is encapsulated. In one embodiment, SDC 120 encapsulates the call signaling message in a signaling connection and control part (SCCP) unit data message. By encapsulating the call signaling message in SCCP, SDC 120 is able to transport the call signaling message to various call service platforms.

In block 212, the encapsulated signaling message is sent to a first service platform. In one embodiment, SDC 120 sends the encapsulated signaling message to call screening service platform 124. Call screening service platform 124 is located on SCS 106 and is frequently accessed first among all other services and applications. In one embodiment, the signaling message may be sent to the first service platform without encapsulation. In an alternate embodiment, the entire signaling message does not have to be sent to the service platform. Rather, only a portion of the signaling message is needed to be received and processed (e.g., the calling party identifier, the called party identifier, etc.) by the service platform.

In block 214, a response message from the first service is received. In one embodiment, SDC 120 receives a "successful" response message from screening service 124 which is sent to inform the SDC that the first service is applied. The response message may include an SCCP message (e.g., IAM message encapsulated in SCCP message). In one embodiment, the response message may include a simple message with a designated bit (e.g., a flipped bit) to indicate that the first service is to be applied.

In block 216, a determination is made as to whether the service application that sent the response is the last service application to be accessed. If the service application is the last service application on in the predefined order contained in the context data of SDC 120, then method 200 continues to block 220. Otherwise, method 200 proceeds to step 218 where the encapsulated message is then sent to the next predefined service.

In block 218, the encapsulated message is sent to the next service. In one embodiment, SDC 120 routes the message to the next service on the list after receiving the successful response message from screening service 124. If the message is external to SCS 106, the message may be sent to STP 104 using a TALI or SIGTRAN link. STP 104 then routes the message to the appropriate external service. However, in the case of a prepaid service (which may be the next predefined service), SDC 120 may send the message to STP 104 on TALI or SIGTRAN and then STP 104 may then route the message to prepaid service 151 over MTP3 user adaptation layer (M3UA) or any other similar SS7 communication protocol. In one embodiment, block 214 may be repeated until each service on the services list is contacted. Method 200 then loops back to block 214, where SDC 120 receives a response message from the service application.

In block 220, the original call signaling message is forwarded to its intended destination. In one embodiment, SDC 120 forwards the original call signaling message to its intended destination with all the appropriate service applications (i.e., all the services subscribed to by the subscriber) to be applied to the call session. Method 200 then ends.

In one embodiment, SDC 120 may handle call signaling messages initially received by STP 104 or STP 105 and invoke specific services for the associated calls. Table 1 shows a list of call signaling messages (i.e., ISUP/TUP messages) which may be handled by SDC 120.

TABLE 1

Message Types handled by the SDC and services

| TUP Message Type | ISUP Message Type | Handled by SDC | Required by Context Sensitive Services | Required by Context insensitive services |
|---|---|---|---|---|
| IAI, IAM, SAM, SAO | IAM, SAM | Yes | Yes | Yes |
| ACM | ACM | Yes | Yes | No |
| ANC, ANU, ANN, FOT, GSM | ANM, FOT, CPG, RES, CON | Yes | Yes | No |
| CLF, CBK, CFL, UNN, ADI, SSB, ADI, LOS, ACB, MPR, EUM, CLF, CCL. GRS | REL, RSC, GRS, SUS, CFN | Yes | Yes | No |
| RLG, RSC | RLC, UCIC | Yes | Yes | No |
| CHG | CRG | Yes | Yes | No |

In one embodiment, any other ISUP/TUP message not listed in Table 1 may be directly routed to the destination or called party 162 via STP 104 or 105.

Figure 3A:
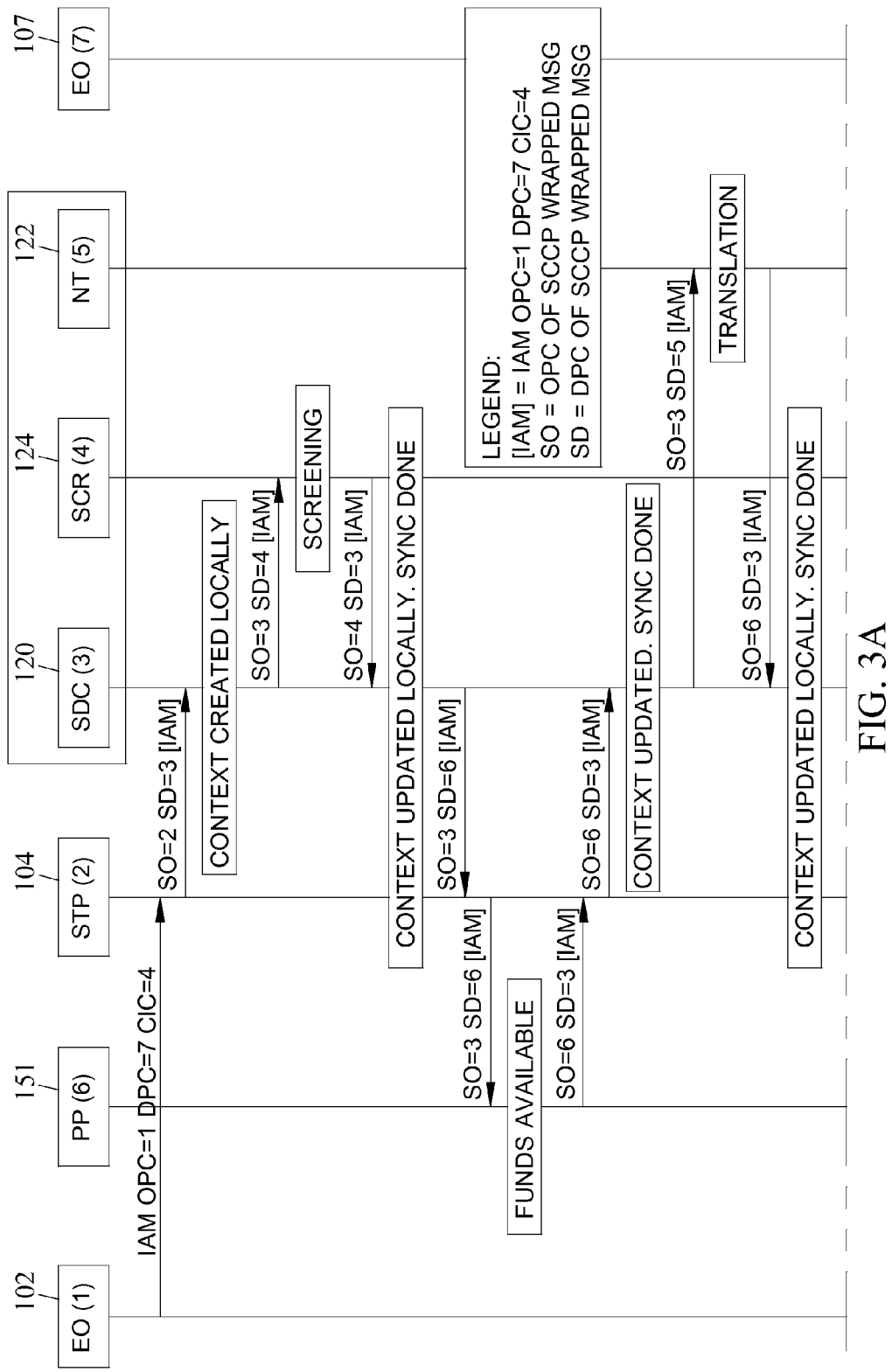
FIG. 3 depicts a call flow diagram for applying call screening, prepaid, and number translation services to a call according to an embodiment of the subject matter described herein.
Figure 3B:
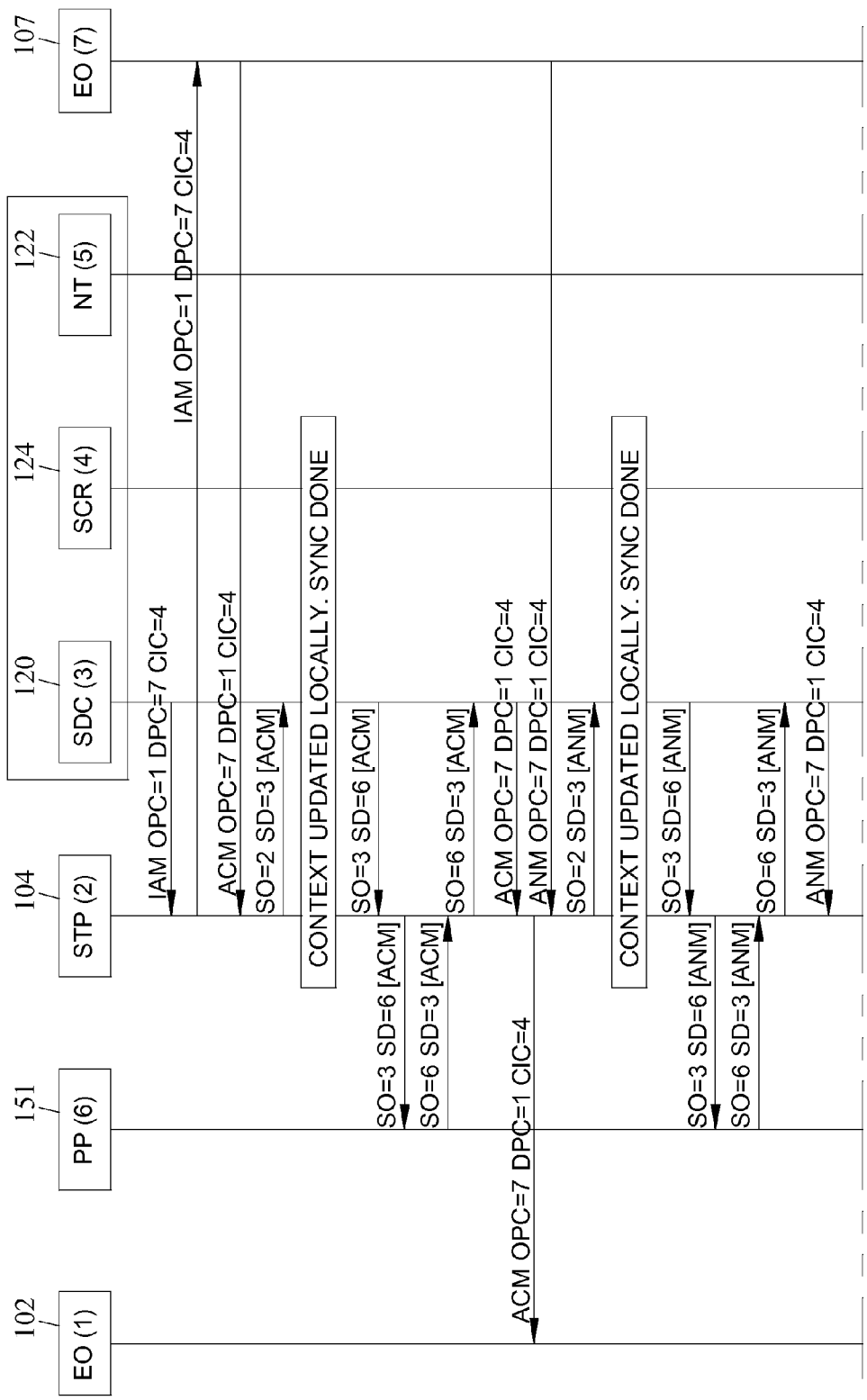
Figure 3C:
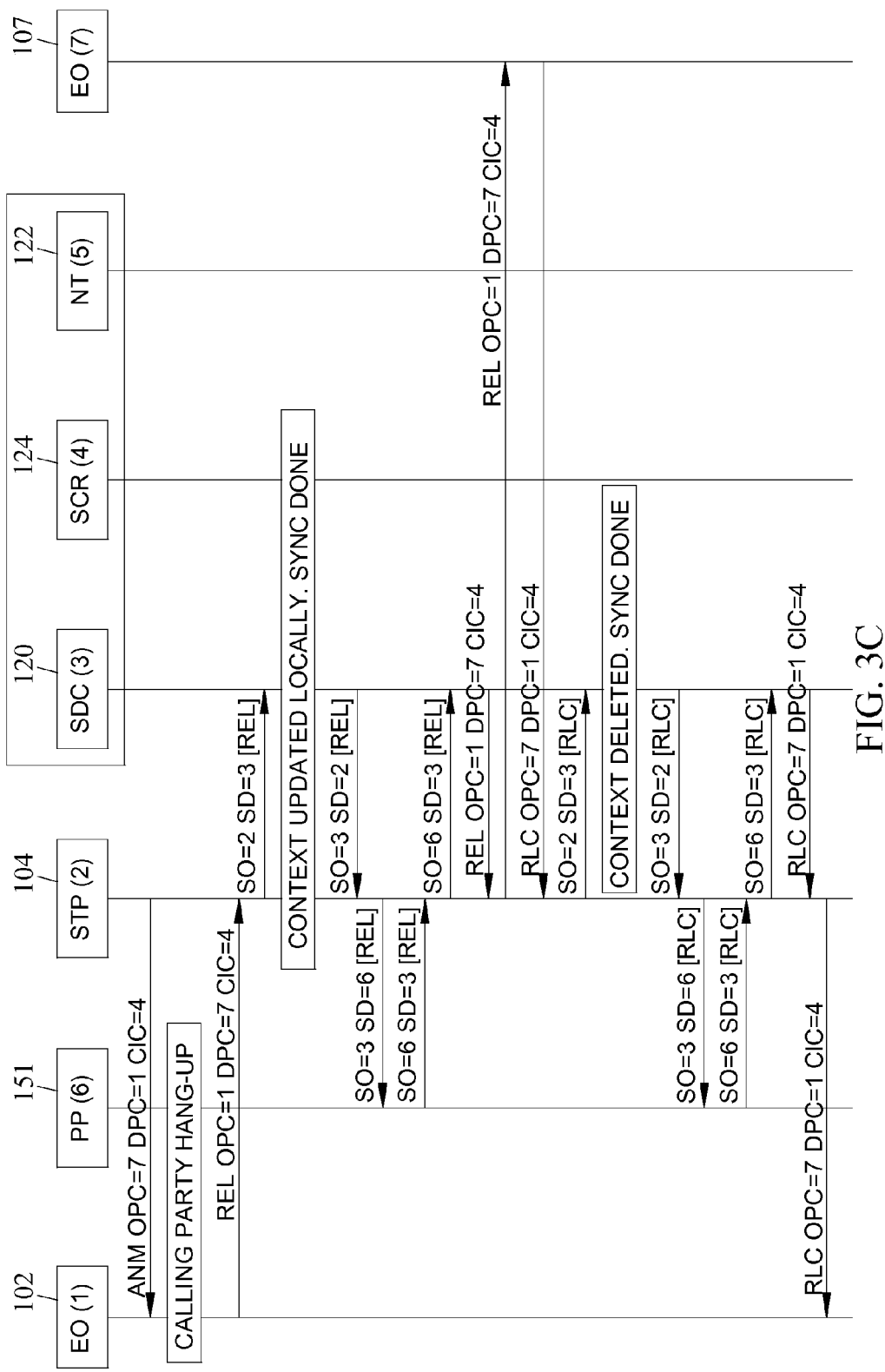

FIG. 3 is an exemplary call flow diagram pertaining to the present subject matter. Specifically, FIG. 3 depicts the contacting a call screening service platform, a prepaid application service platform, and number translation (NT) (e.g., ENUM, number portability) service platform. Referring to FIG. 3, EO 102 forwards an IAM addressed with an OPC=1, DPC=7 and a CIC=4 to STP 104. In this example, the originating point code (OPC) is the point code of EO 102 and the destination point code (DPC) is the point code of EO 107. FIG. 3 illustrates that a call signaling message (e.g., IAM message) is then sent from STP 104 to SDC 120. Upon receiving the call signaling message, context data is created locally at SCS 106. After the call context data is created, FIG. 3 depicts a message (e.g., an encapsulated call signaling message) being sent to screening function 124. Presumably, screening function 124 is the first service listed in a subscriber database 126 stored in SDC 120 (see FIG. 1). Screening function 124 then sends a "successful" response message back to SDC 120 where context data 121 is updated locally and synchronized across cluster 103. SDC 120 then sends an IAM message intended for prepaid application 151. In this scenario, it is presumed that prepaid application service 151 is the second listed service in the subscriber database 126. Upon receiving the message, prepaid application 151 performs an internal query and determines that funds are available for the subscriber to continue the call. Prepaid application 151 then sends a response message back to SDC 120 via STP 104. Upon receiving the message, SDC 120 updates call context data 121 and synchronizes the data across the servers of cluster 103. SDC 120 then sends a message to number translation service 122 (i.e., the third service on the database list). After performing a number translation (e.g., an ENUM service, number portability, etc.), number translation service 122 sends a successful response message to SDC 120, which updates context data 121 and synchronizes it across cluster 103. The call signaling message is then sent to the destination end office 107 via STP 104.

STP 104 then receives an ACM message intended for EO 101 from EO 107. STP 104 forwards the intercepted message to SDC 120 where the context data is updated locally and a synchronization procedure is performed. SDC 120 then forwards the ACM message to prepaid server 151 via STP 104. Prepaid server 151 checks its database and then forwards the message to SDC 120 via STP 104. SDC 120 then sends the ACM message to EO 102. After the ACM message is received by EO 102, EO 107 may send an ANM message to EO 102 in accordance to the transmission of the ACM message previously described. However, before receiving the ANM message, SDC 120 receives an encapsulated version of the message from STP 104 and updates the context data, performs a synchronization procedure, and forwards the message to prepaid service 151. The ANM message is then sent to EO 102 and the calling party hangs up. Consequently, a release message addressed to EO 107 is received by SDC 120 which then updates the context data, performs a synchronization procedure, and forwards the message to prepaid service 151. SDC 120 receives the release message back from prepaid service 151 and sends it to EO 107 via STP 104. EO 107 responds by issuing a release confirmation (RLC) message which is received by EO 102 after being processed by SDC 120 and prepaid service 151.

Figure 4:
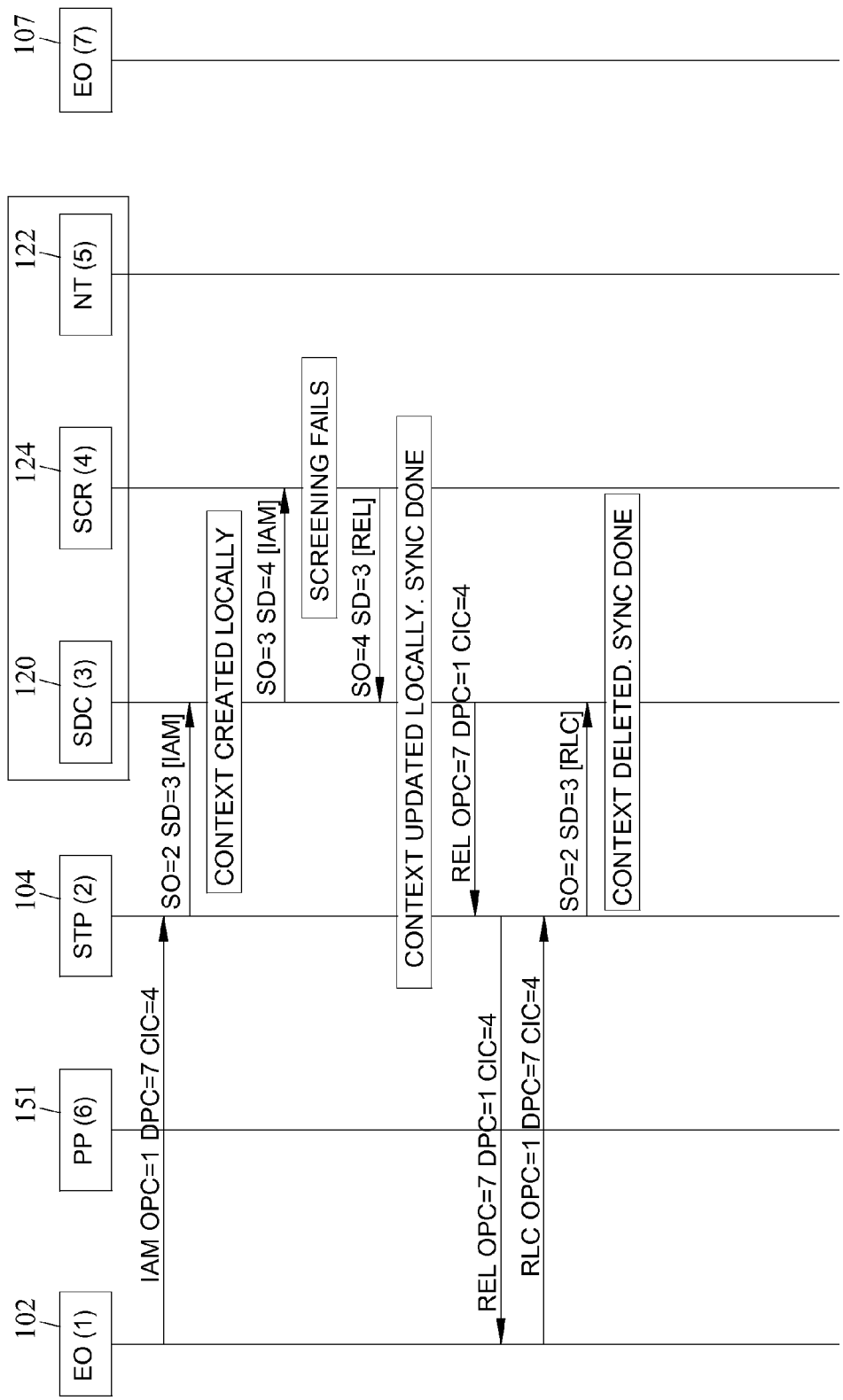
FIG. 4 depicts a call flow diagram depicting the processing of a call that has failed an initial screening process according to an embodiment of the subject matter described herein.

FIG. 4 is an exemplary call flow involving the present subject matter. Specifically, FIG. 4 depicts the processing of a call that has failed an initial screening process. For example, EO 102 sends an IAM message addressed to EO 107. The message is initially received by STP 104, which then forwards the message to SDC 102 where the context information is created locally. The IAM message is then forwarded to the screening function 124 which subsequently determines that the initiating caller is not permitted to make the call. At this point, screening function 124 sends a release message to SDC 120, which then updates the context data locally and performs a synchronization procedure across cluster 103. The release message is then sent to EO 102 via STP 104. EO 104 then sends a release confirmation (RLC) message back to SDC 120, which subsequently deletes the context data and performs a synchronization procedure.

Figure 5A:
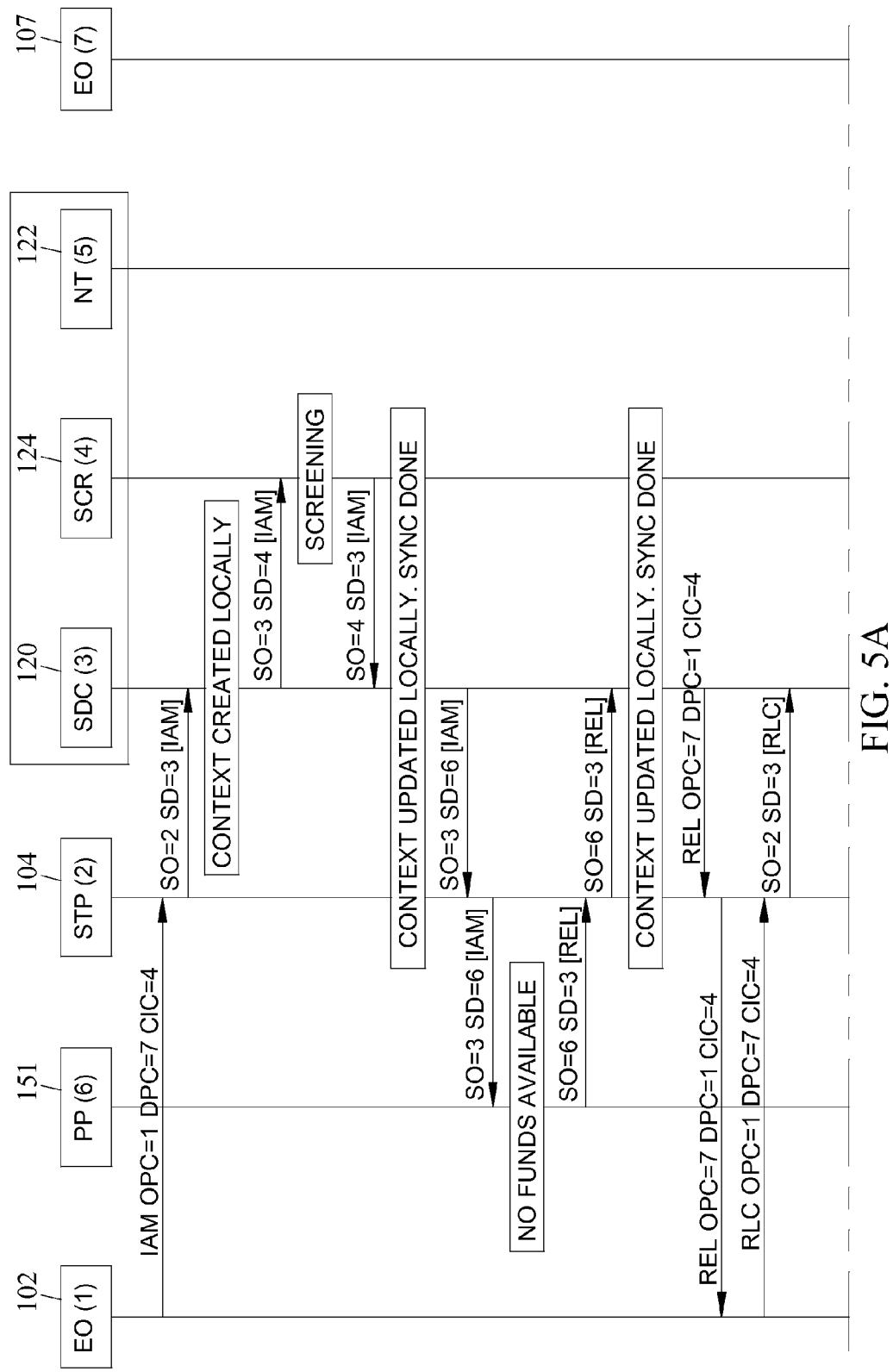
FIG. 5 depicts a call flow diagram for applying screening and prepaid services to a call when no funds are available according to an embodiment of the subject matter described herein.
Figure 5B:
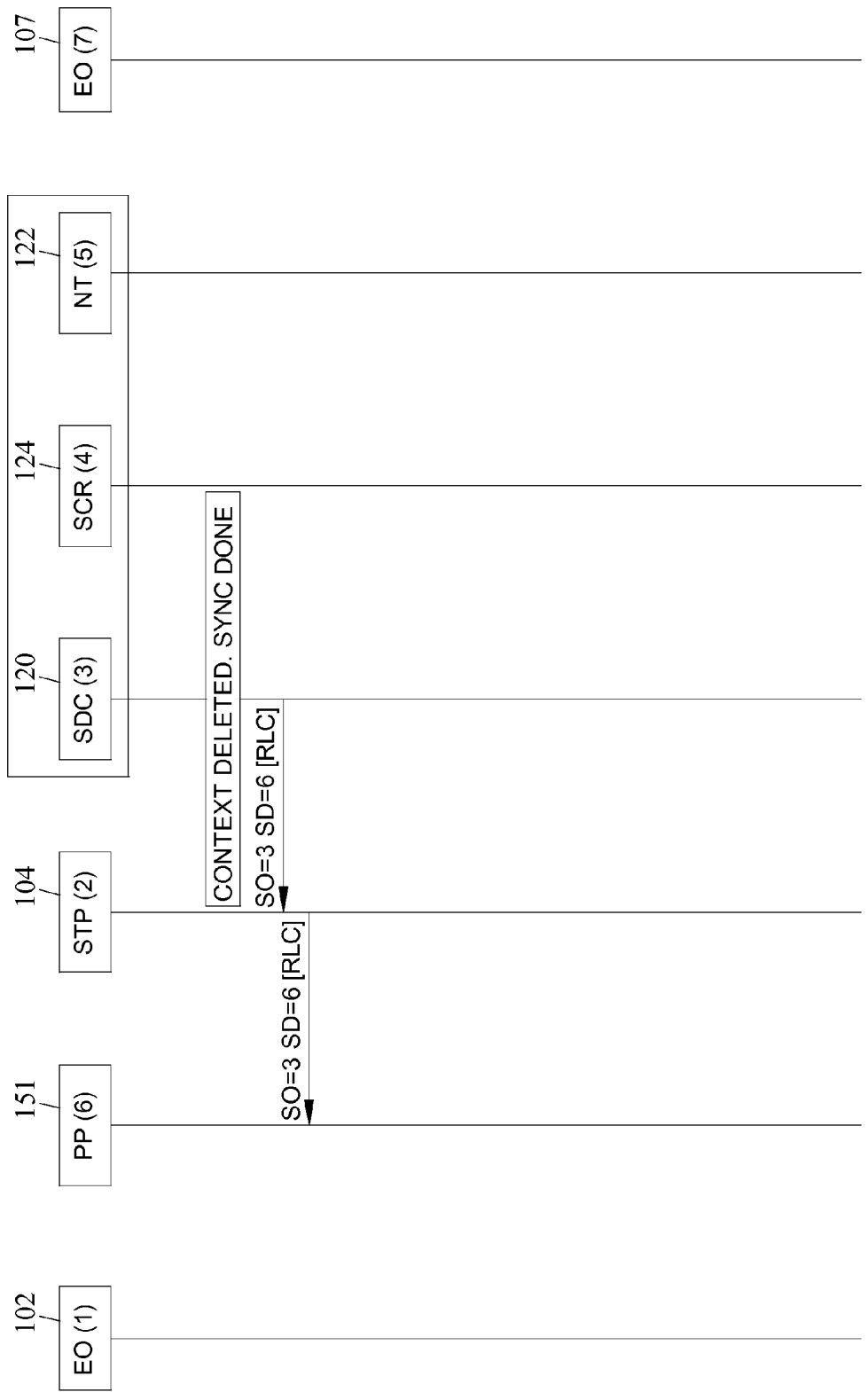

FIG. 5 is an exemplary call flow involving the present subject matter. Specifically, FIG. 5 illustrates the application of screening and prepaid services to a call when no funds are available. Notably, EO 102 sends an IAM message addressed to EO 107 via STP 104, which then forwards the message to SDC 102 where the context information is created locally. The IAM message is then forwarded to the screening function 124 which subsequently determines that the initiating caller is permitted to make the call. At this point, screening function 124 sends the IAM message back to SDC 120, which then updates the context information locally and performs a synchronization procedure across cluster 103. The IAM message is then sent to prepaid server 151 which then determines that there are no funds available for the calling subscriber. Prepaid server 151 then sends a release message to SDC 120 (via STP 104). SDC 120 updates the context information locally and performs a synchronization procedure. SDC 120 then sends a release message to EO 102 via STP 104. EO 102 responds by sending a release confirmation (RLC) message back to SDC 120, which then deletes the context data and executes a synchronization procedure. An RLC message is then sent to prepaid server 151.

Figure 6A:
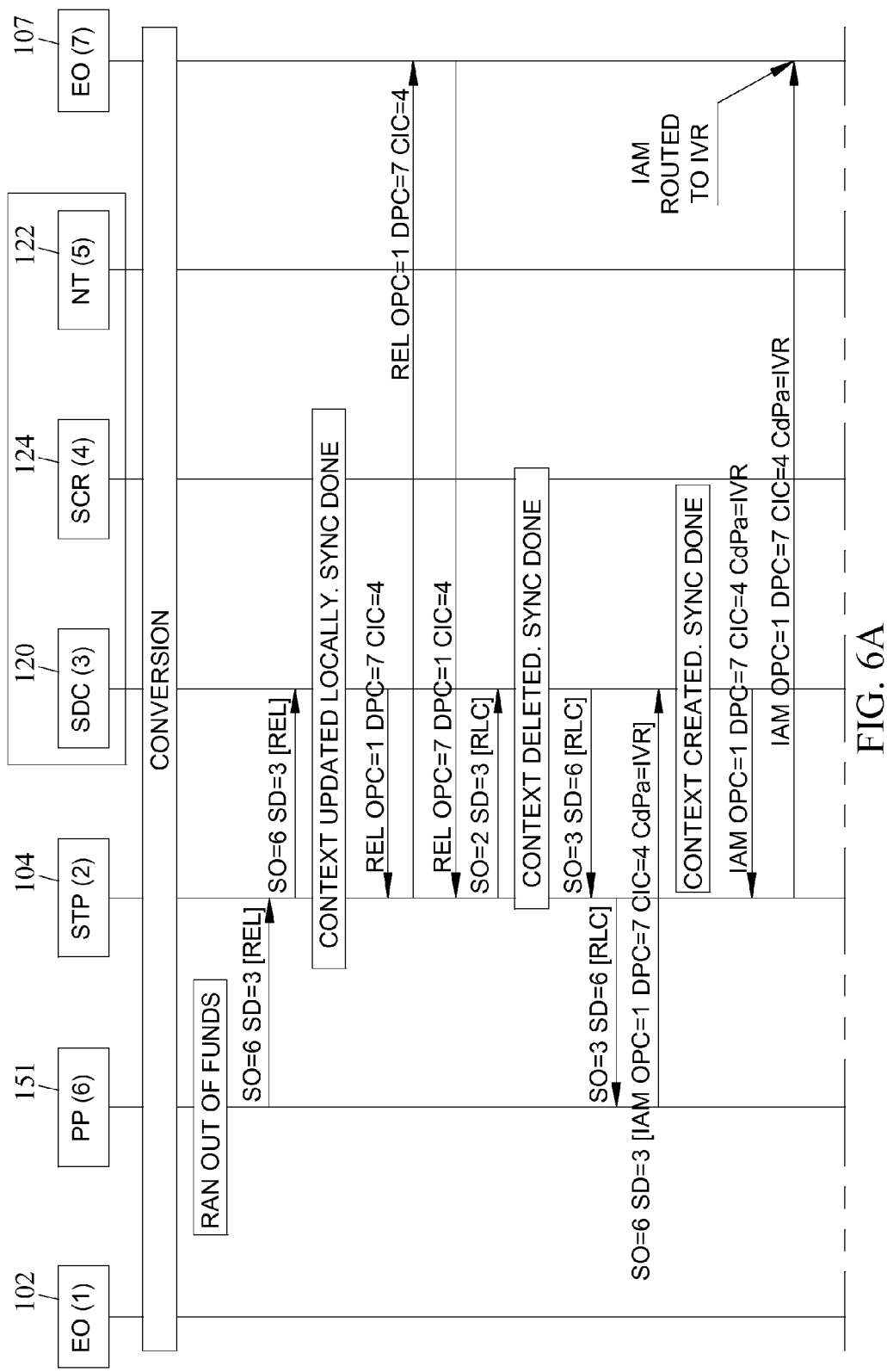
FIG. 6 depicts a call flow diagram depicting a prepaid call with a mid-call release due to a shortage of funds according to an embodiment of the subject matter described herein.
Figure 6B:
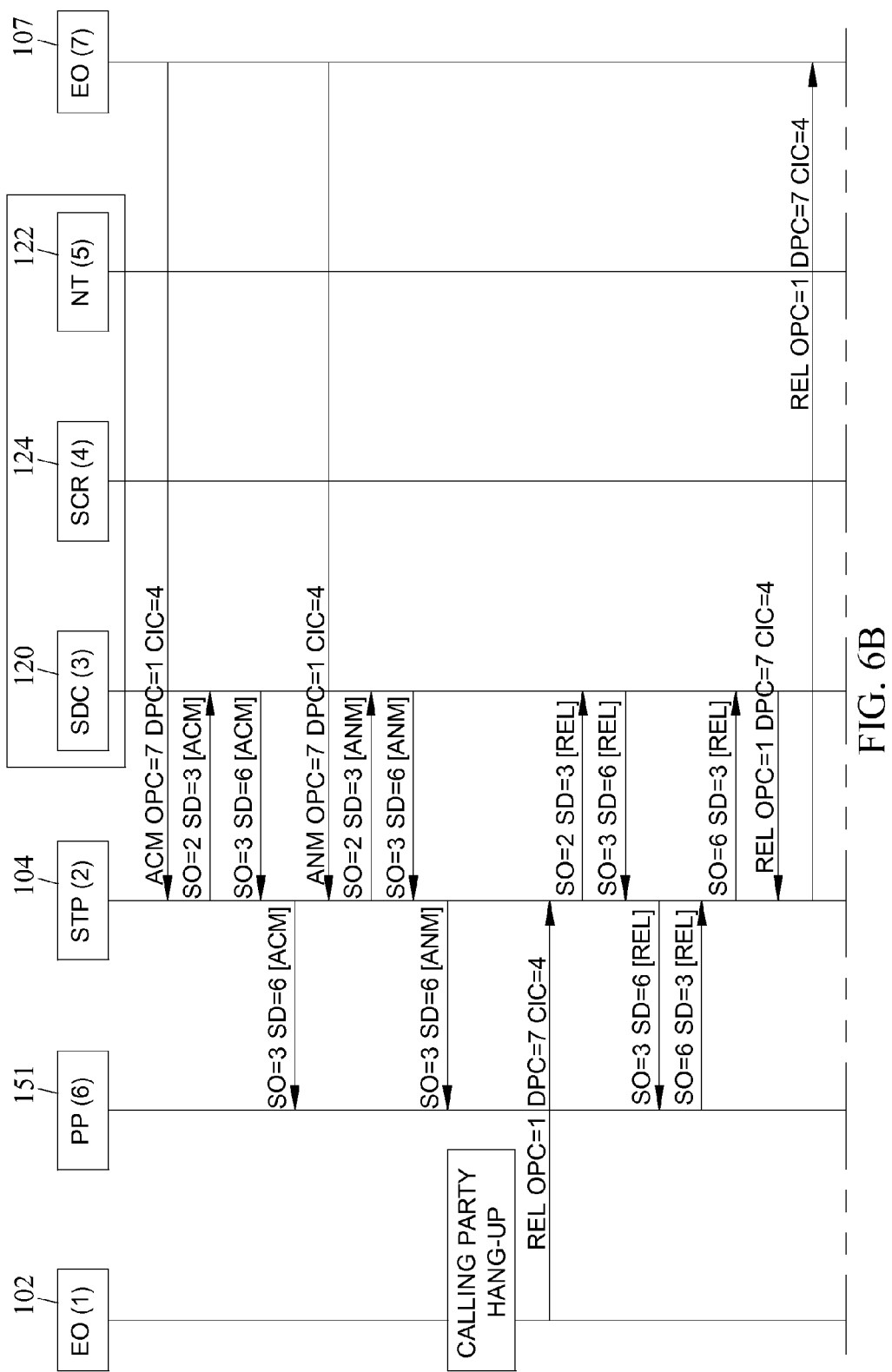
Figure 6C:
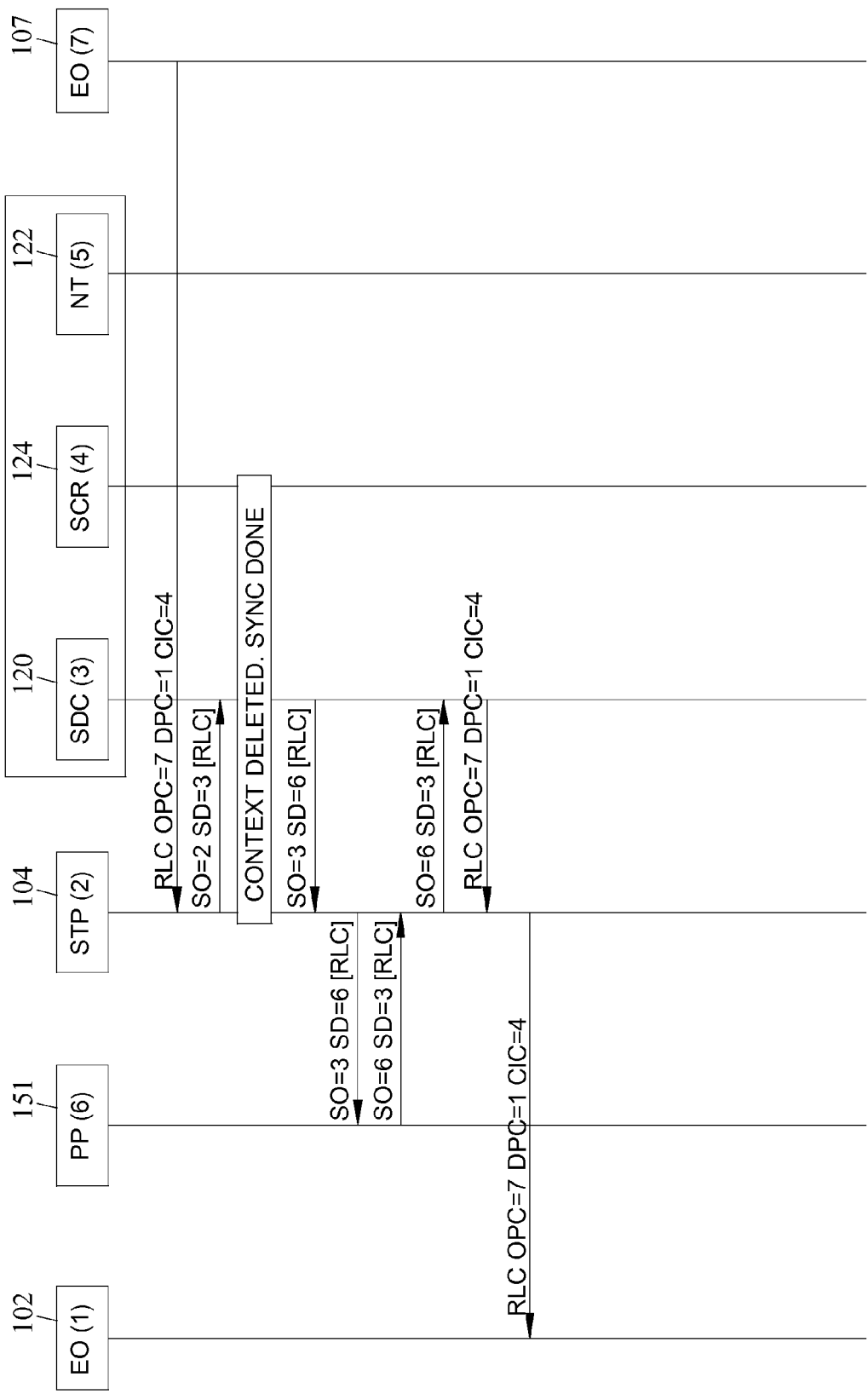

FIG. 6 is an exemplary call flow involving the present subject matter. Specifically, FIG. 6 depicts a prepaid call with a mid-call release due to a shortage of funds. Namely, in the event the caller runs out of funds during a conversation, prepaid server 151 detects the shortage and issues a release message to SDC 120 via STP 104. SDC 120 updates context information locally and initiates a synchronization procedure across cluster 103. SDC 120 then forwards the release message to EO 107. In response, EO 107 returns an RLC message to EO 102 which is intercepted by SDC 120 (via STP 104). Upon receiving the release confirmation message, SDC 120 deletes the context information and executes a synchronization process. SDC 120 then forwards the RLC message to prepaid server 151 (via STP 104). Prepaid server 151 then sends an IAM to SDC 120, which then creates a new instance of context information (because the call is new) and executes a synchronization procedure across cluster 103. SDC 120 then sends the IAM message to EO 107. Once received at EO 107, the IAM message is routed to an IVR platform. In one embodiment, the IVR platform may be supported by a standalone server that is communicatively connected to EO 107. In an alternate embodiment, the IVR platform may be integrated with prepaid services platform 151. EO 107 then directs an ACM message to EO 102. After a series of ACM and ANM messages between SDC 120, STP 104, and prepaid application 151, the calling party hangs up (presumably after receiving a voice message from the IVR). EO 102 then sends a release message to EO 107.

Figure 7A:
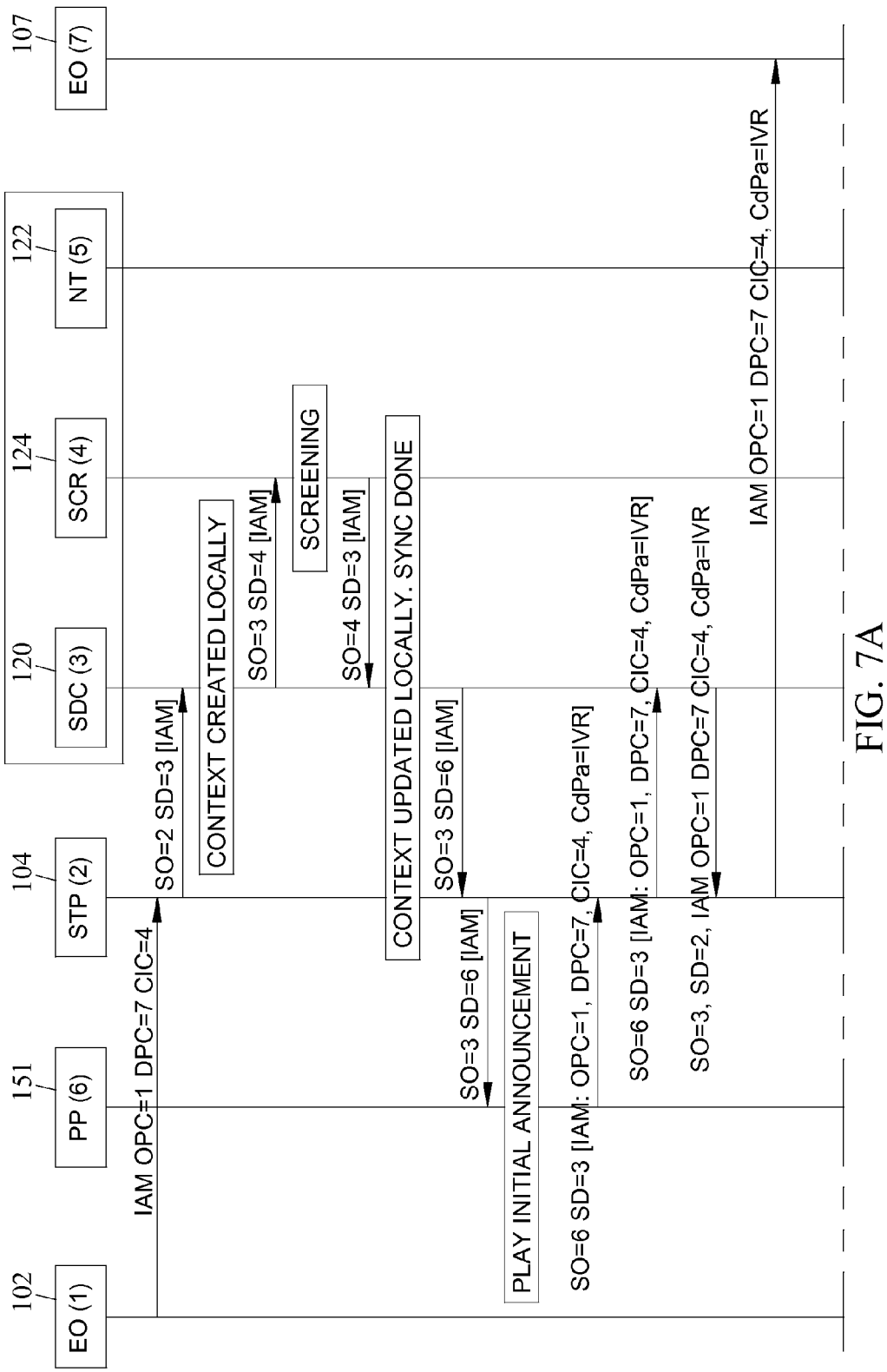
FIG. 7 depicts a call flow diagram for applying call screening service and prepaid service that utilizes an initial interactive voice response (IVR) voice message according to an embodiment of the subject matter described herein.
Figure 7B:
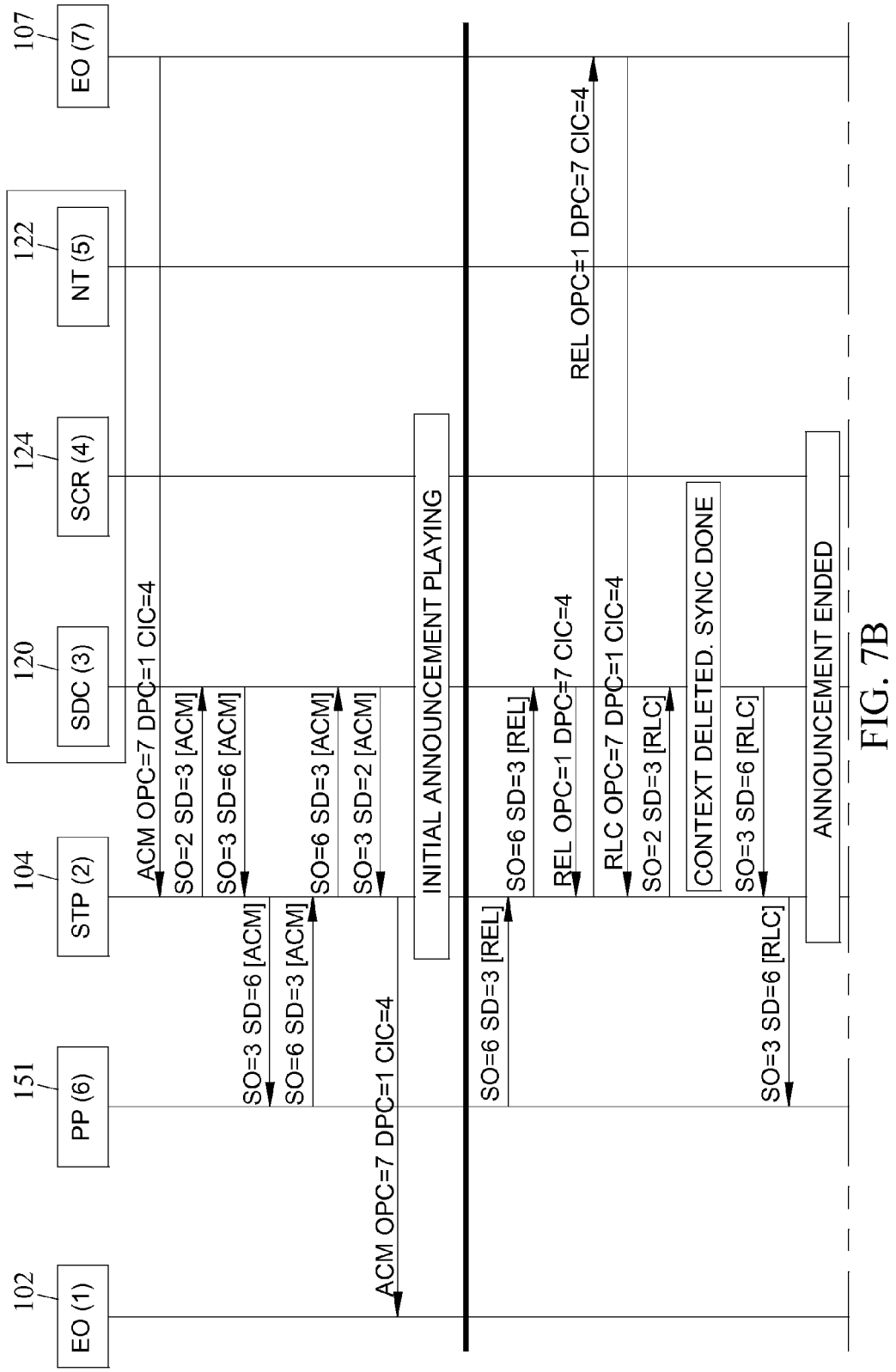
Figure 7C:
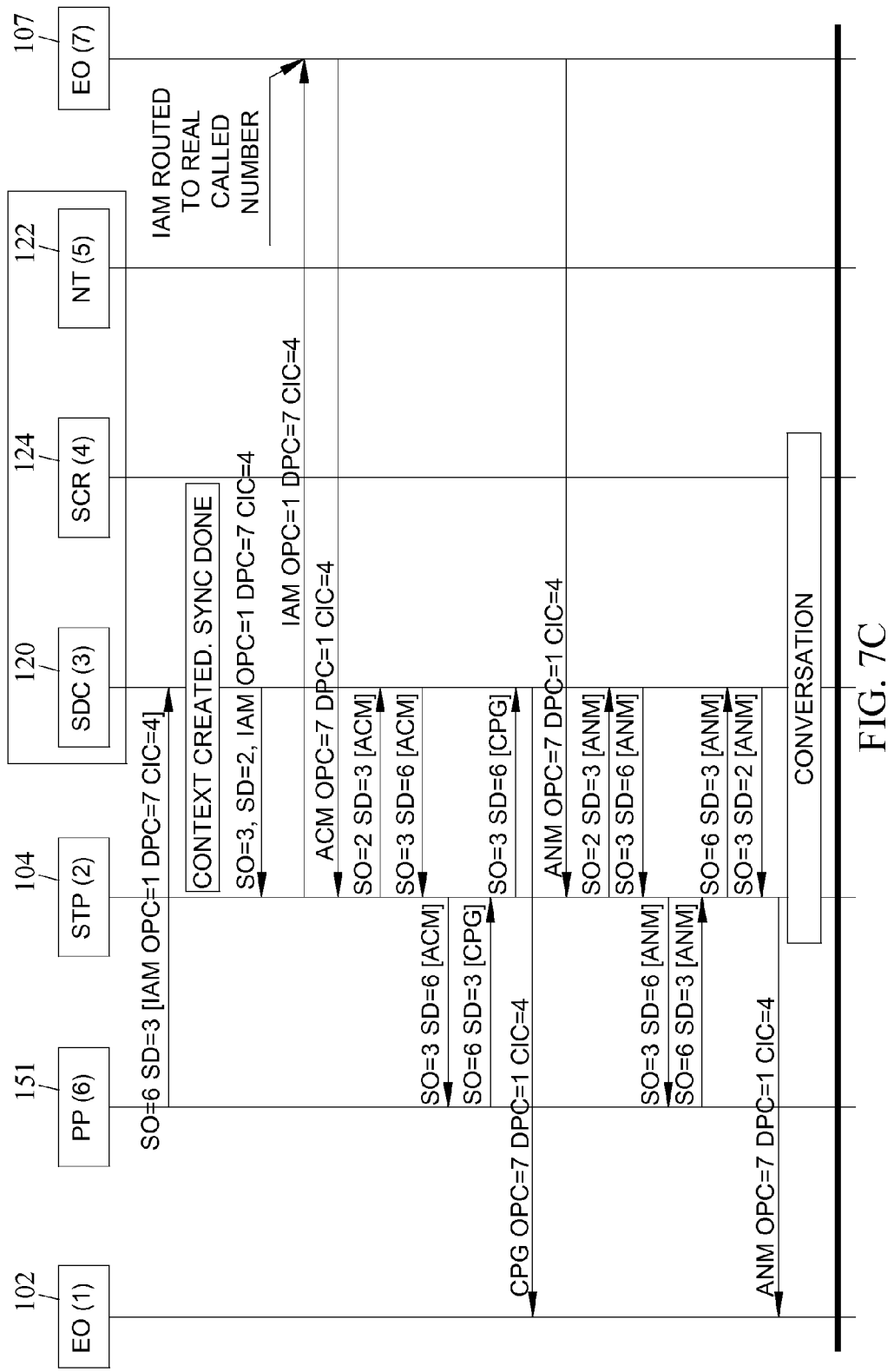

FIG. 7 is an exemplary call flow involving the present subject matter. Specifically, FIG. 7 depicts the applying of call screening service and prepaid service, which utilizes an IVR voice message. EO 102 initially sends an IAM message addressed to EO 107 via STP 104. STP 104 encapsulates the IAM message in an SCCP message and forwards it to SDC 120. SDC 120 creates context data and sends the SCCP message to screening platform 124, which then returns the SCCP message to SDC 120 after the screening process is complete. SDC 120 then updates the context data, synchronizes the data across cluster 103 (i.e., in case any of the services are network/context-sensitive services) and sends the encapsulated IAM message to prepaid services platform 151, which subsequently plays an initial announcement. The SCCP message with the IVR is sent to EO 107 via SDC 120 and STP 104. EO 107 responds by sending an ACM message addressed to EO 102 via STP 104 (and SDC 120 and prepaid platform 151). At this point, an initial announcement message (e.g., "Your account has 15 minutes remaining") is played. Prepaid platform 151 then sends an encapsulated release message to SDC 120. SDC then sends a release message to EO 107 (via STP 104). EO 107 responds by returning an RLC message to SDC 120, which then deletes the context data because it is no longer required and executes a synchronization procedure. SDC 120 then sends an encapsulated SCCP RLC message to prepaid service platform 151. At this time, the initial announcement ends. Prepaid service platform 151 then sends an encapsulated IAM message addressed to EO 107 via SDC 120, which creates context data and performs a synchronization procedure. When EO 107 receives the IAM message, the IAM message is routed to the called party number. EO 107 responds by sending an ACM message to EO 102. The ACM message is ultimately intercepted by prepaid service platform 151, which then forwards an encapsulated CPG message to EO 102. Around this time, EO 107 also sends an ANM message to EO 102 via STP 104, prepaid service platform 151, and SDC 120. After EO 102 receives the ANM message, the conversation between the two parties commences.

Figure 8:
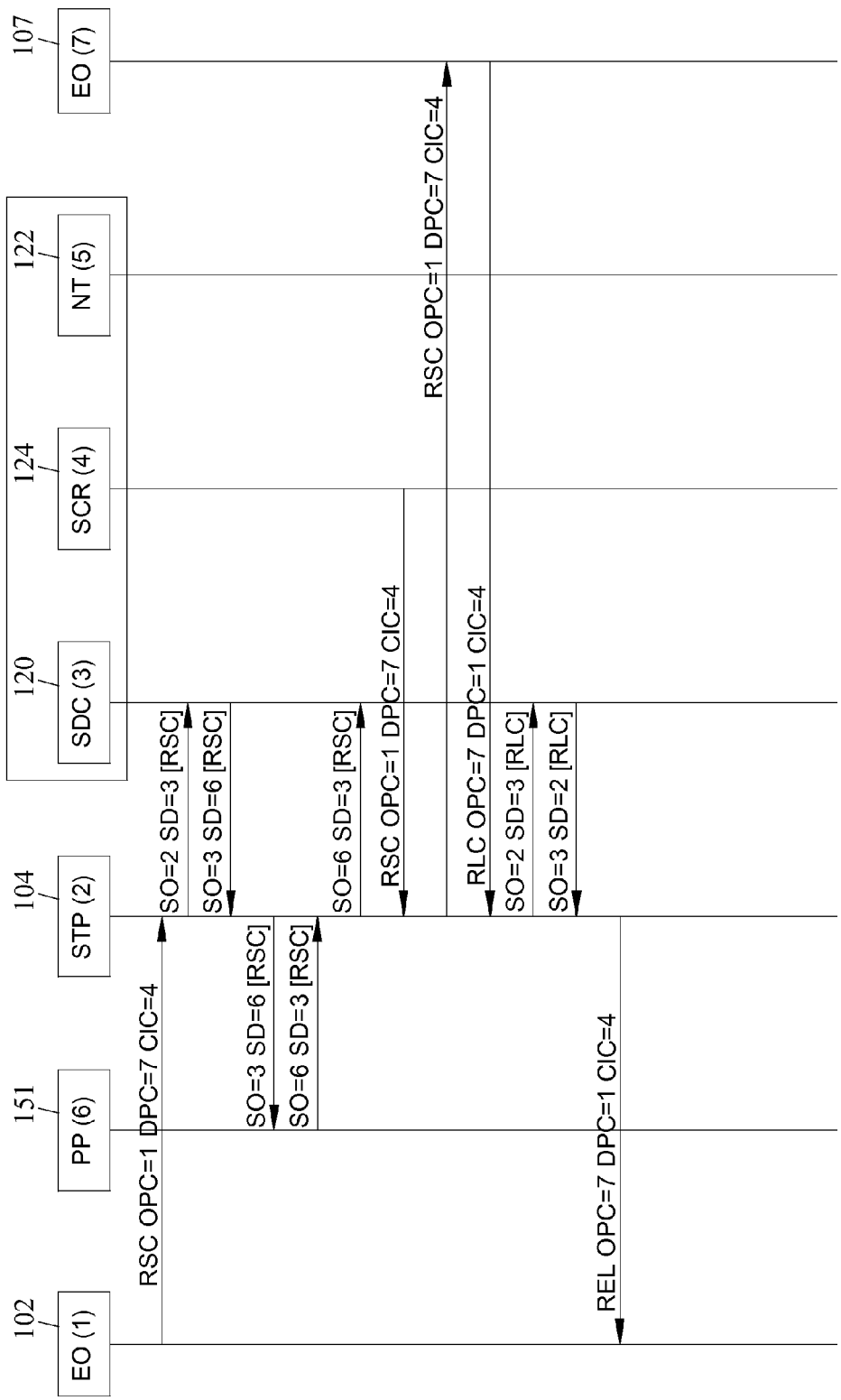
FIG. 8 depicts a call flow diagram for handling a reset circuit (RSC) message according to an embodiment of the subject matter described herein.

FIG. 8 is an exemplary call flow involving the present subject matter. Specifically, FIG. 8 depicts the handling of a reset circuit (RSC) message. EO 102 initially sends an RSC message addressed to EO 107 that is received by SDC 120 via STP 104. SDC 120 then sends the RSC message (which is encapsulated in an SCCP message) to prepaid application 151 before the RSC message is ultimately forwarded to EO 107. In response, EO 107 sends an RLC message to EO 102 via STP 104 and SDC 120.

Figure 9:
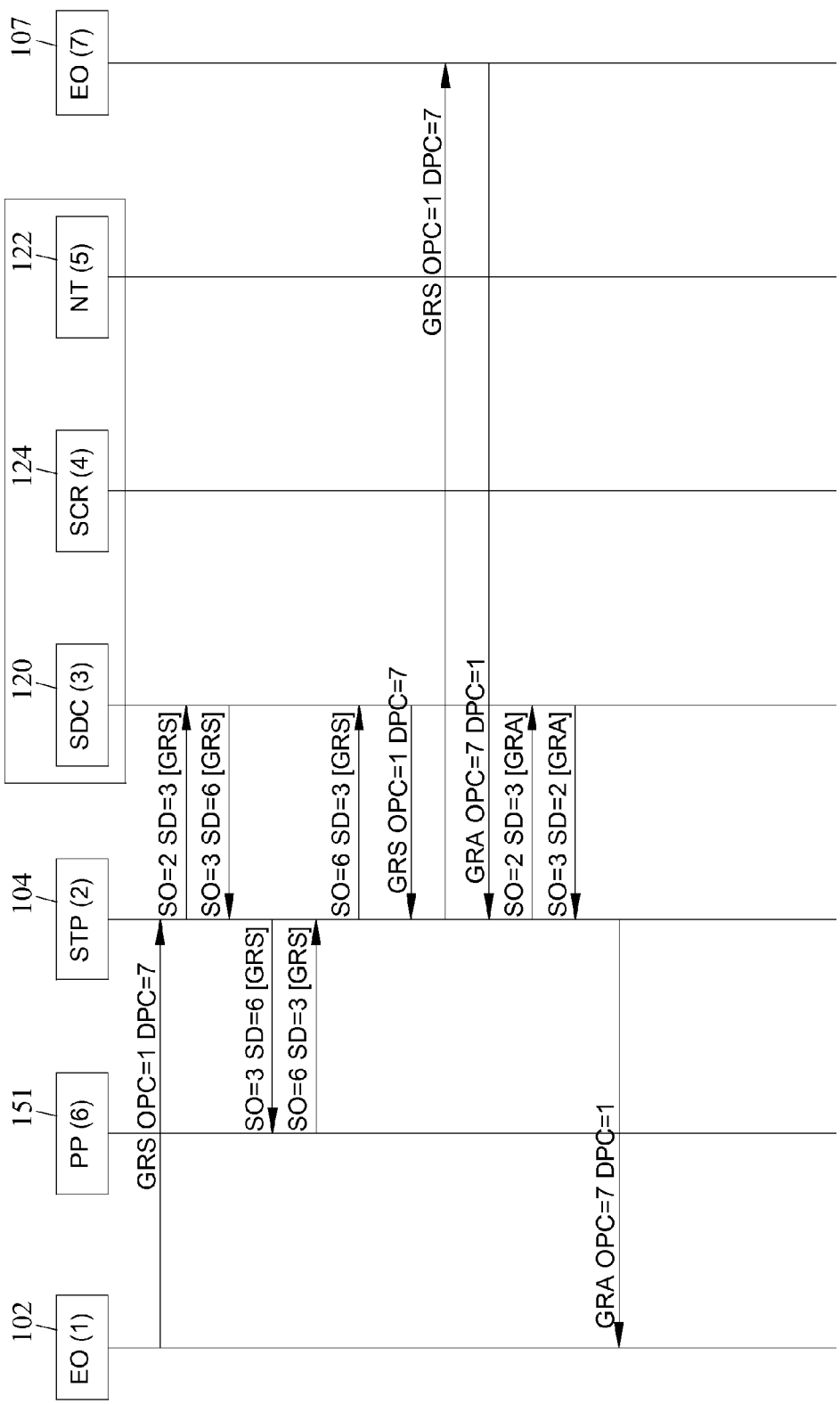
FIG. 9 depicts a call flow diagram for handling a group reset (GRS) message according to an embodiment of the subject matter described herein.

FIG. 9 is an exemplary call flow involving the present subject matter. Specifically, FIG. 9 depicts the handling of a group reset (GRS) message. EO 102 initially sends a GRS message addressed to EO 107 that is received by SDC 120 via STP 104. SDC 120 then sends the GRS message (which is encapsulated in an SCCP message) to prepaid application 151 before the GRS message is ultimately forwarded to EO 107. In response, EO 107 sends a GRA message to EO 102 via STP 104 and SDC 120.

As mentioned above, SDC 120 may be configured to synchronize call context information across all instances of SDC applications (i.e., SCS servers) running in cluster 103. There are at least two possible IDB synchronization configurations that typically exist in system 100. In one scenario, there is synchronization between SMS node 108 and all the SCS nodes 106 in cluster 103. For example, the SMS node 108 may act as a primary server with respect to IDB synchronization management and may synchronize all ancillary servers (i.e., child servers). In one embodiment, all SCS nodes 106 in cluster 103 act as "ancillary" servers and may be synchronized only with SMS node 108. Notably, SMS node 108 may become susceptible as a single point of failure in this scenario. However, since SMS node 108 is currently used for synchronizing the provisioning data (which does not change too often), SMS node 108 may be considered as a non-critical resource during call processing.

Similarly, a second synchronization process exists between all SCS nodes 106 for SDC call context synchronization in cluster 103. Specifically, SMS node 108 is not included in the synchronization process in this scenario. Because call context data needs to be synchronized, there may be a separate IDB configuration required between the SCS nodes 106 in cluster 103 (i.e., SMS node 108 does not require this data). In order to implement this approach, a primary server in cluster 103 may be configured/designated at installation time to handle IDB network transactions from SCS node 106 and propagate the instructions to the remaining SCS nodes 106 in cluster 103. Since the primary SCS server node can be a single point of failure, a designate secondary SCS server may be designated. The secondary SCS server node may be configured to failover to change its role to become a primary server in the event the originally designated primary SCS server node becomes unavailable. This feature may be implemented using a FailMon daemon on SCS servers.

In one embodiment, these daemons are responsible for enabling SCS nodes 106 to consider their role as predefined in database 126 at start up time. Based on the pre-configured role stored in the database, a primary SCS server daemon and a secondary SCS server daemon may continue to run while the remaining SCS server daemons exit. The primary and secondary SCS servers may be configured to exchange periodic heartbeats to ensure that both SCS servers are functioning properly and no failover actions need to be taken. For example, the designated secondary SCS server may wait for three consecutive heartbeats to be missed (e.g., three heartbeat messages sent to primary server without a response) before initiating a failover action. In one embodiment, the heartbeat threshold number may be hardcoded. In the event a failover action is initiated, the FailMon process informs all the ancillary SCS servers about the primary role switchover (i.e., when the secondary server becomes the primary server). In the case where a forced or manual failover procedure is executed, the FailMon process may inform the current primary server and the ancillary SCS servers about the change of primary SCS server (i.e., the secondary server is now the new primary server).

The key to these two parallel syncing configurations is to use different (PRODID, RUNID) IDB instances. In one embodiment, the existing SMS syncing mechanism may use (PRODID=01, RUNID=00) and can continue its existing functionality. Similarly, the new SCS syncing mechanism may use (PRODID=01, RUNID=01). It may have a new IDB table and network transaction handlers to support syncing of call context data. SDC 120 may conduct most of its processing in the original (PRODID=01, RUNID=00) setup, but when it has to generate/access any call context specific data, SDC 120 uses database handlers pointing to the (PRODID=01, RUNID=01) IDB. This database handler is created once at application startup and not created on per call basis. In one embodiment, the new (PRODID=01, RUNID=01) setup does not have complete SCS data. Notably, the setup includes limited platform daemons like procmgr, inetsync, idbsvc, FailMon running. One goal for this new IDB configuration is to synchronize the call context data across the all SCS servers 106 in SCS cluster 103. Also, the inetconfig utility may be used to configure this new syncing setup at install time.

In one embodiment, the connection shared between SDC 120 and STPs 104, 105 may include an external TALI or SIGTRAN interface. SDC 120 may utilize this link to establish and indirect interface (via STPs 104, 105) to other external nodes, such as prepaid application server 151. SDC 120 may have interface with internal SCS based applications (such as screening and number portability) through COM-COL based IPC queues.

Messages received by STP 104 or 105 from an external switch may be gateway screened before database transport accessed (DTA) over TALI or SIGTRAN to SDC 120. SDC 120 may send SCCP encapsulated ISUP/TUP messages to STP 104 that may be GT translated and routed to a prepaid application server/SCP over an M3UA interface.

In one embodiment, SDC 120 only receives SCCP messages from STP 104 or from local applications (e.g., number translation service platform 122 and call screening service platform 124). STP 104 has a DTA feature that sends ISUP MSU data (starting from MTP2) to SDC 120. In one embodiment, the ISUP MSU data is encapsulated in SCCP user data. An exemplary format of the encapsulated SCCP message from EO 102 to SDC 120 via STP 104 is as follows:

---

SCCP Header

MessageType (1 Byte)
ServiceClass (1 Byte)
CdPA Offset (1 Byte)
CgPA Offset (1 Byte)
Payload Offset (1 Byte)
Called Party address Length (1 Byte)
Called Party Address Indicator (1 Byte)
PC LSB (if PC is present)
PC MSB (if PC is present)
SSN of Called Party App (1 Byte-if SSN is present)
Translation Type (1 Byte-if TT is present)
Address
Calling Party address Length (1 Byte)
Calling Party Address Indicator (1 Byte)
PC LSB (if PC is present)
PC MSB (if PC is present)
SSN of Calling Party App (1 Byte-if SSN is present)
Data Length (SCCP Payload)-1 Byte
MTP2

1 Bit: BIB 7 Bit: BSN
1 Bit: FIB 7 Bit: FSB
2 Bit: Spare 6 Bit: Length Ind
MTP3

SIO
2 Bit: Network Indicator
2 Bit: Network Priority
4 Bit: Service Indicator
8 LSBits: DPC
Last 6 bits –> 6 MSBits of DPC
First 2 bits –> 2 LSBits of OPC
8 Bits –> 8 Middle Bits of OPC
Last 4 Bits –> 4 MSBits of OPC
First 4 bits –> SLS
ISUP CIC (2 Bytes)
CIC
MessageType (1 Byte)

---

In one embodiment, SDC 120 may send an ISUP MSU back to EO 102 over TALI in the following exemplary format. Notably, TALI opcode="isot" is used for transmitting these messages via the TALI link. TALI processing at STP 104 may use this data for further routing to the destination switch.

---

MTP3

SIO
2 Bit: Network Indicator
2 Bit: Network Priority
4 Bit: Service Indicator
8 LSBits: DPC
Last 6 bits –> 6 MSBits of DPC
First 2 bits –> 2 LSBits of OPC
8 Bits –> 8 Middle Bits of OPC
Last 4 Bits –> 4 MSBits of OPC -continued

| | |
|---|---|
| First 4 bits –> SLS | |
| ISUP | |
| CIC (2 Bytes) | |
| CIC | |
| MessageType (1 Byte) | |
| ... | |
| ... | |
| ... | |

In one embodiment, the present subject matter may significantly affect existing SCS services. For example, screening service 124 and number translation service 122 may not have any direct communication with STP 104 on TALI or SIGTRAN. Also, screening service 124 and number translation service 122 may be configured to receive and send all messages to SDC 120. Screening and NT services may communicate with SDC 120 on the same SCS host using IPC (i.e. COMCOL queues which are implemented using shared memory).

In one embodiment, the inter-process communication between the processes of these service platforms may be implemented using bi-directional shared memory message queues. Each instance of an SDC controlled service may own a shared memory queue and act as a server for that resource. SDC 120, which can act as a client, may push the call messages on these queues and the screening service 124 or number translation service 122 may read process the message and send a response back via the same message queue. SDC 120 may also perform load balancing on these instances on a round robin basis.

In one embodiment, each SHM queue owned by the service instances can be uniquely identified (key) by a port number parameter (used by SDC 120, which is acting as a client to the shared memory owned by services). For example, the format for this value may include:
For: Application with SSN=XYZ, Instance Id=NM=>Port Number=XYZNM In one embodiment, each instance of an application/service creates SHM queues with these port values and SDC 120 may use the same algorithm while identifying and connecting to these queues. This mechanism may allow local service interactions to be very fast as well as avoiding latency and load on the STP (because of the lack of hopping on the STP).

In one embodiment, SDC 120 may play the role of "turn-by-turn" invocation of services during a call in a controlled environment. The application responsible for executing this feature needs static, as well as dynamic, information about the services that the application controls. For example, graphical user interface (GUI) and MML are synchronized for the update of the provisioning data in SDC 120 for add/modify and delete operations. The following exemplary tables store this provisioning data provided by the operator from the SMS GUI and MML commands:
Table Name: Managed Service Info This provisioning information is controlled by SCS 106 for its internal use and is required for managing the SCS hosted and external services which may be co-coordinated by SDC 120.

| Field Name | Description |
|---|---|
| Service Name | Text string to represent service name for e.g. TCS, NT, PP etc. |
| Service Identifier | Service identifier Key (a unique number to identify service) |
| Service SSN | Sub-System Number for the application. For e.g. All instances of TCS application may have SSN = 245. |
| Point Code | Point Code of the node where the service application is running. For e.g.: The Prepaid applications are running on PC = 3-169-6 NOTE: We assume that all nodes in a SCS cluster may send the messages to Prepaid service on the same PC (same node). |
| Precedence | This field may be used to define the order in which the services subscribed by a customer may be triggered. For e.g. For a Customer = 213658854 (MSISDN) Subscribed for (Service1, SSN = 233 Precedence = 2), (Service2, SSN = 245, Precedence = 1), (Service3, SSN = 135, Precedence = 3) Then the services may be triggered in this order: Service2 –> Service1 –> Service3 (as per precedence associated) |
| Context Sensitive Flag (TRUE/FALSE) | This represents that weather the service does some call context management or not. If this flag is FALSE, then only the initial IAM message may be sent to this service and after its response no further communication is done. If this flag is TRUE, then all subsequent messages received from external entities may be propagated to this service for processing. |
| Collocated Flag (LOCAL/REMOTE) | This may identify if the service applications exist on the same machine as the SDC (local) or on a separate machine (remote). This may decide the communication mechanism i.e. if one same machine then SMH Message Queues may be used, else messages may be routed via Eagle. |
| Management Status Flag (UP/DOWN) | This represents if the service has to be managed by SDC feature or not. If the Status is DOWN, then SDC may not route messages to this service. |
| Leg Type (ORIGINITATING/ TERMINATING) | This indicates if this service is to be executed in the originating/terminating leg of the call. For e.g. Call Forwarding Service can be executed on the terminating party and SCREENING service can be executed on the originating party. |
| Mutually Exclusive Service List | This is the list of services (SSN's) that cannot run along with this service. This list may be used to validate the subscribed service list for any subscriber. (for future use) |
| Number of instances | This may be used by SDC to access the IPC queues and load sharing across the instances of this service |

Table Name: Subscriber Service List

This provisioning information includes the subscriber and an associated list of services. SDC 120 may access this data based upon a calling party number in the IAM received from a customer network and extract the list of services which need to be applied to the call.

| Field Name | Description |
| --- | --- |
| Calling Party Number | Subscriber number |
| Service List | List of Service Identifier(s), which the subscriber has registered. |

Statistics and Reports

In one embodiment, the user can generate statistical reports through the Reports display. SDC 120 may be configured to generate statistics about the messages that it receives and processes. The report selection list may include the reports based on following statistics generated by the SDC application:

ISUP Peg Counters
Total number of ISUP messages received
Total number of IAM messages received
Total number of ACM messages received
Total number of ANM messages received
Total number of REL messages received
Total number of RLC messages received
ISUP Peg Counters by Origination Point Code
Total number of ISUP messages received, by Origination Point Code
Total number of IAM messages received, by Origination Point Code
Total number of ACM messages received, by Origination Point Code
Total number of ANM messages received, by Origination Point Code
Total number of REL messages received, by Origination Point Code
Total number of RLC messages received, by Origination Point Code
ISUP Peg Counters by Destination Point Code
Total number of ISUP messages received, by Destination Point Code
Total number of IAM messages received, by Destination Point Code
Total number of ACM messages received, by Destination Point Code
Total number of ANM messages received, by Destination Point Code
Total number of REL messages received, by Destination Point Code
Total number of RLC messages received, by Destination Point Code
TUP Peg Counters
Total number of TUP messages received
Total number of IAI, IAM, SAM, SAO messages received
Total number of ACM messages received
Total number of CLF, CBK, CFL, UNN, ADI messages received
Total number of ANC, ANU, ANN messages received
Total number of RLG messages received
TUP Peg Counters by Origination Point Code
Total number of TUP messages received, by Origination Point Code
Total number of IAI, IAM, SAM, SAO messages received, by Origination Point Code
Total number of ACM messages received, by Origination Point Code
Total number of CLF, CBK, CFL, UNN, ADI messages received, by Origination Point Code
Total number of ANC, ANU, ANN messages received, by Origination Point Code
Total number of RLG messages received, by Origination Point Code
TUP Peg Counters by Destination Point Code
Total number of TUP messages received, by Destination Point Code
Total number of IAI, IAM, SAM, SAO messages received, by Destination Point Code
Total number of ACM messages received, by Destination Point Code
Total number of CLF, CBK, CFL, UNN, ADI messages received, by Destination Point Code
Total number of ANC, ANU, ANN messages received, by Destination Point Code
Total number of RLG messages received, by Destination Point Code To generate a report, the user may provide the reporting interval and the roll-up interval. In one embodiment, the SMS maintains statistics in 15 minute units. The roll-up interval controls the number of 15 minute units that can be included in each report record.

In one embodiment, program trace is the ability for an application instance to write diagnostic messages into its trace file. The type of information written to the trace file can be controlled in real-time by setting the application instance's trace mask where each bit represents a specific type of information. The trace file operates as a circular file which prevents the file from consuming unexpected amounts of disk space. The maximum size of a trace file can be set in real-time. Many of the SCS's programs are capable of generating trace messages.

Like most SCS programs, SDC 120 may generate vital traces when it performs a significant activity (e.g., starting up or shutting down) and when SDC 120 detects a significant problem. Vital traces may be written to a trace file. In addition to the vital traces, SDC 120 may be capable of generating several types of trace entries that are controlled by the bits in its trace mask.

During performance testing and when SDC 120 is under load in the field, trace generation can have a significant impact on the performance of the SDC application. The following list identifies the important trace bits supported by SDC 120:

Service invocation—These traces may include the information like calling number, called number, services subscribed and services invoked for a call.
All ISUP messages received—Traces every ISUP message received by the SDC application in hexadecimal.
All ISUP messages sent—Traces every ISUP message sent by the SDC application in hexadecimal.
All ISUP messages received from services—Traces every ISUP message received by the SDC application in hexadecimal.
All ISUP messages sent to services—Traces every ISUP message sent by the SDC application in hexadecimal.

In one embodiment, alarms may be generated by the new code written for SDC 120 and may contain an alarm identifier. This may not pertain to libraries (e.g., COMCOL) used by SDC 120. For example, the following alarms may be generated during the call processing at SDC 120:

1. Decoding Error: When SDC 120 is unable to decode a message received from the STP 104, the SDC 120 may trace the message in hex, generate an alarm, and send back the message to Eagle STP on TALI or SIGTRAN. The alarm may state that there was a "decoding problem" and that the SCS operations staff should call customer support for help in resolving the problem.

2. Overriding the existing context: If SDC 120 receives an IAM message from the network and there is already existing context of the call, SDC 120 may trace the message in hex, generate an alarm, and reinitialize the context and handles it as a fresh call. The alarm may state that there was an "Overriding of existing context" problem, and that the SCS operations staff should call customer support for help in resolving the problem.
3. Service not available: If SDC 120 is not able to write the message on the IPC channel towards the screening or NT service due to unavailability of the screening or NT instances or memory full problem, SDC 120 can trace the message in hex, generate an alarm. SDC 120 may send a REL message to all active services involved with that call and then send the Release to originating party stating that the "service is not available." The alarm may state that there was a "Locally hosted service not available" problem, and that the SCS operations staff should call customer support for help in resolving the problem.
4. Call Data Synchronization failed: SCS 106 may generate alarm if the SDC 120 is not able to synchronize the call related data with other SCS servers 106$_{1 \ldots n}$.
5. Service not provisioned: SCS 106 may generate alarm if the SDC 120 is unable to retrieve the data (like point code, priority, etc.) for the subscribed service.

In one embodiment, early in its initialization procedure, SDC 120 may generate a vital trace indicating that SDC 120 is starting up. This trace may contain the program's revision and is a clear indication that the program has restarted. Late in its termination procedure, SDC 120 may generate a vital trace indicating that SDC 120 is exiting. When this trace is missing, it indicates that the program aborted instead of terminating normally. Anytime SDC 120 has been killed, an SCS process procmgr may restart it.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for applying a plurality of services to a call in a communications system, the method comprising:
   receiving, at one of a plurality of service dispatch and control (SDC) functions, a single signaling message associated with a call, wherein the signaling message includes a calling subscriber identifier;
   determining, at the SDC and based on the calling subscriber identifier, a plurality of call services associated with the subscriber identifier that is to be applied to the call and an order in which the plurality of services is to be applied; and
   communicating, in the order determined by the SDC function, plural messages, each including at least a portion of the signaling message, from the SDC function to a plurality of service platforms comprising IP multimedia subsystem (IMS) application servers and receiving, at the SDC function and from the IMS application servers, response for each of the plurality of call services and thereby sequentially applying the call services to the call, wherein communicating the plural messages includes:
   sending an encapsulated signaling message to a first service platform for applying a first call service to the call;
   receiving the encapsulated signaling message from the first service platform indicating that the first call service is applied to the call; and
   sending the encapsulated signaling message to a second service platform for applying a second call service to the call and wherein the encapsulated signaling message comprises an IP-encapsulated signaling message.

2. The method of claim 1 further comprising:
   generating call context data that is associated with the call, wherein the call context data includes an order in which the plurality of call services are to be applied to the call; and
   provisioning the call context data to the remaining plurality of SDC functions.

3. The method of claim 2 wherein provisioning the call context data includes providing a copy of the call context data to each of the plurality of SDC functions.

4. The method of claim 3 wherein the call context data is provisioned if the signaling message is sent to a context sensitive application.

5. The method of claim 2 wherein the call context data includes at least one of an origination point code (OPC), a destination point code (DPC), and a circuit identification code (CIC).

6. The method of claim 1 wherein the plurality of call services includes at least one of a call screening service, a number translation service, and a prepaid application service.

7. The method of claim 1 wherein the SDC function communicates to a local service platform using an inter process communications (IPC) mechanism.

8. The method of claim 1 wherein the calling subscriber identifier includes a calling party identifier.

9. The method of claim 1 wherein an order of the first service platform and second service platform is designated in call context data.

10. A system for applying a call service to a call comprising:
    a service dispatch and control (SDC) function for receiving a single signaling message associated with a call at one of a plurality of service dispatch and control (SDC) functions;
    wherein the signaling message includes a calling subscriber identifier;
    for determining, at the SDC function and based on the calling subscriber identifier, a plurality of call services associated with the subscriber identifier that is to be applied to the call and an order in which the plurality of call services is to be applied to the call;
    for communicating, in the order determined by the SDC function, plural messages, each including at least a portion of the signaling message, from the SDC function to a plurality of service platforms comprising IP multimedia subsystem (IMS) application servers; and
    receiving response at the SDC function for each of the plurality of call services and thereby sequentially applying the call services to the call;
    wherein the SDC function is adapted to send an encapsulated signaling message to a first service platform for applying a first call service to the call, receive the encapsulated signaling message from the first service platform indicating that the first call service is applied to the call, and send the encapsulated signaling message to a second service platform for applying a second call service to the call and wherein the signaling message comprises an IP-encapsulated signaling message.

11. The system of claim 10 wherein the SDC function is further adapted to generate call context data that is associated with the call, wherein the call context data includes the order in which the plurality of call services are to be applied to the call, and provision the call context data to the remaining plurality of SDC functions.

12. The system of claim 11 wherein the SDC function is further adapted to provide a copy of the call context data to each of the plurality of SDC functions.

13. The system of claim 12 wherein the call context data is provisioned if the signaling message is sent to a context sensitive application.

14. The system of claim 11 wherein the call context data includes at least one of an origination point code (OPC), a destination point code (DPC), and a circuit identification code (CIC).

15. The system of claim 10 wherein the plurality of call services includes at least one of a call screening service, a number translation service, and a prepaid application service.

16. The system of claim 10 wherein the SDC function communicates to a local service platform using an inter process communications (IPC) mechanism.

17. The system of claim 10 wherein the calling subscriber identifier includes a calling party identifier.

18. The system of claim 10 wherein an order of the first service platform and second service platform is designated in call context data.

19. A computer program product comprising computer executable instructions embodied in a non-transitory computer readable medium for performing steps comprising:

receiving, at one of a plurality of service dispatch and control (SDC) functions, a single signaling message associated with a call, wherein the signaling message includes a calling subscriber identifier;

determining, at the SDC and based on the calling subscriber identifier, a plurality of call services associated with the subscriber identifier that is to be applied to the call and an order in which the plurality of services is to be applied; and communicating, in the order determined by the SDC function, plural messages, each including at least a portion of the signaling message, from the SDC function to a plurality of service platforms comprising IP multimedia subsystem (IMS) application servers and receiving, at the SDC function and from the IMS application servers, response for each of the plurality of call services and thereby sequentially applying the call services to the call, wherein communicating the plural messages includes:

sending an encapsulated signaling message to a first service platform for applying a first call service to the call;

receiving the encapsulated signaling message from the first service platform indicating that the first call service is applied to the call; and sending the encapsulated signaling message to a second service platform for applying a second call service to the call and wherein the encapsulated signaling message comprises an IP-encapsulated signaling message.

* * * * *